(12) United States Patent
Hester et al.

(10) Patent No.: US 7,440,462 B2
(45) Date of Patent: Oct. 21, 2008

(54) QUALITY OF SERVICE (QOS) CONTROL MECHANISMS USING MEDIATION DEVICES IN AN ASYNCHRONOUS NETWORK

(75) Inventors: Lance Eric Hester, Sunrise, FL (US); Qicai Shi, Coral Springs, FL (US); Jian Huang, Coral Springs, FL (US); Edgar Herbert Callaway, Jr., Boca Raton, FL (US)

(73) Assignee: Motorola, Inc., Schaumburg, IL (US)

( * ) Notice: Subject to any disclaimer, the term of this patent is extended or adjusted under 35 U.S.C. 154(b) by 909 days.

(21) Appl. No.: 10/443,424

(22) Filed: May 22, 2003

(65) Prior Publication Data

US 2003/0231597 A1    Dec. 18, 2003

Related U.S. Application Data

(60) Provisional application No. 60/383,454, filed on May 23, 2002.

(51) Int. Cl.
*H04L 12/28* (2006.01)
(52) U.S. Cl. .................. 370/395.4; 370/311; 370/235; 370/252; 370/304; 370/401
(58) Field of Classification Search ................ 370/304, 370/311, 235, 236.1, 252, 310, 313, 342, 370/349, 350, 395.2, 395.4, 401, 428, 429; 455/412, 500, 507, 515, 517, 522
See application file for complete search history.

(56) References Cited

U.S. PATENT DOCUMENTS

| | | | |
|---|---|---|---|
| 4,313,036 A | 1/1982 | Jabara et al. | |
| 4,534,061 A | 8/1985 | Ulug | |
| 4,794,649 A | 12/1988 | Fujiwara | |
| 4,816,989 A | 3/1989 | Finn et al. | |
| 5,128,938 A | 7/1992 | Borras | |
| 5,241,542 A | 8/1993 | Natarajan et al. | |
| 5,278,831 A | 1/1994 | Mabey et al. | |
| 5,329,531 A | 7/1994 | Diepstraten et al. | |
| 5,371,734 A | 12/1994 | Fischer | |
| 5,418,835 A | 5/1995 | Frohman et al. | |
| 5,530,846 A | 6/1996 | Strong | |
| 5,533,100 A | 7/1996 | Bass et al. | |
| 5,584,048 A | 12/1996 | Wieczorek | |
| 5,590,396 A | 12/1996 | Henry | |
| 5,636,243 A | 6/1997 | Tanaka | |
| 5,699,409 A | 12/1997 | Kojima | |
| 5,778,052 A | 7/1998 | Rubin et al. | |
| 5,797,094 A * | 8/1998 | Houde et al. ............. | 455/412.2 |
| 5,845,204 A | 12/1998 | Chapman et al. | |
| 5,940,771 A | 8/1999 | Gollnick et al. | |
| 5,943,397 A | 8/1999 | Gabin et al. | |
| 5,991,287 A | 11/1999 | Diepstraten et al. | |

(Continued)

*Primary Examiner*—Ricky Ngo
*Assistant Examiner*—Kibrom T Hailu

(57) ABSTRACT

Mediation devices in an asynchronous network of low power consumption communication devices are leveraged through the use of new protocols (2500) that analyze relevant QoS parameters (2520) in order to provide a better than best effort service in the network. These protocols invoke adaptive quality of service (QoS) mechanisms to capitalize on the strength and flexibility provided to the network by the presence of one or more MDs, as described above. Expanded functionality of the MD includes control information messaging and service differentiation for the purpose of improving QoS of the network.

42 Claims, 13 Drawing Sheets

U.S. PATENT DOCUMENTS

| | | | |
|---|---|---|---|
| 5,991,635 A | 11/1999 | Dent et al. | |
| 6,018,642 A | 1/2000 | Adachi | |
| 6,044,069 A | 3/2000 | Wan | |
| 6,047,200 A | 4/2000 | Gibbons et al. | |
| 6,058,289 A | 5/2000 | Gardner et al. | |
| 6,104,788 A | 8/2000 | Shaffer et al. | |
| 6,138,019 A | 10/2000 | Trompower et al. | |
| 6,192,230 B1 | 2/2001 | van Bokhorst et al. | |
| 6,259,772 B1 | 7/2001 | Stephens et al. | |
| 6,285,892 B1 | 9/2001 | Hulyalkar | |
| 6,317,415 B1 | 11/2001 | Darnell et al. | |
| 6,335,927 B1 * | 1/2002 | Elliott et al. | 370/352 |
| 6,351,522 B1 | 2/2002 | Vitikainen | |
| 6,356,538 B1 | 3/2002 | Li | |
| 6,414,955 B1 | 7/2002 | Clare et al. | |
| 6,480,476 B1 | 11/2002 | Willars | |
| 6,484,027 B1 | 11/2002 | Mauney et al. | |
| 6,516,007 B1 | 2/2003 | Hong et al. | |
| 6,522,873 B1 | 2/2003 | Moles et al. | |
| 6,564,074 B2 | 5/2003 | Romans | |
| 6,574,266 B1 | 6/2003 | Haartsen | |
| 6,580,721 B1 * | 6/2003 | Beshai | 370/428 |
| 6,671,525 B2 | 12/2003 | Allen et al. | |
| 6,744,750 B1 | 6/2004 | Berger | |
| 6,748,502 B2 | 6/2004 | Watanabe et al. | |
| 6,816,493 B2 * | 11/2004 | Shi et al. | 370/395.4 |
| 6,826,153 B1 | 11/2004 | Kroon | |
| 6,928,061 B1 | 8/2005 | Garcia-Luna-Aceves et al. | |
| 6,968,052 B2 | 11/2005 | Wullert | |
| 6,975,655 B2 * | 12/2005 | Fischer et al. | 370/516 |
| 6,982,960 B2 | 1/2006 | Lee et al. | |
| 7,020,501 B1 | 3/2006 | Elliot et al. | |
| 7,133,373 B2 * | 11/2006 | Hester et al. | 370/311 |
| 7,173,927 B2 * | 2/2007 | Kumar et al. | 370/352 |
| 7,251,256 B1 | 7/2007 | Barry et al. | |
| 7,269,162 B1 | 9/2007 | Turner | |
| 2002/0126627 A1 | 9/2002 | Shi et al. | |
| 2002/0163932 A1 | 11/2002 | Fischer et al. | |
| 2003/0114204 A1 | 6/2003 | Allen et al. | |
| 2003/0123634 A1 * | 7/2003 | Chee | 379/220.01 |
| 2003/0185170 A1 | 10/2003 | Allen et al. | |
| 2006/0291643 A1 * | 12/2006 | Pfaff et al. | 379/221.12 |

* cited by examiner

-PRIOR ART-

-PRIOR ART-even# QUALITY OF SERVICE (QOS) CONTROL MECHANISMS USING MEDIATION DEVICES IN AN ASYNCHRONOUS NETWORK

RIGHT OF PRIORITY

This application claims priority to and benefit of earlier filing date of U.S. Provisional Application No. 60/383,454, filed May 23, 2002 and being further identified by the content of which is incorporated herein by reference.

CROSS REFERENCE TO RELATED APPLICATIONS

This application is related to the following copending applications entitled "Beacon Assisted Hybrid Asynchronous Wireless Communications Protocol" 10/022,964, "System and Method for Asynchronous Communications Employing Direct and Indirect Access Protocols" Ser. No. 10/108,116, "A Multiple Access Protocol and Structure for Communication Devices in an Asynchronous Network" Ser. No. 09/803,322, and are herein incorporated by reference.

FIELD OF THE INVENTION

The present invention relates generally to communication networks and more specifically to quality of service (QoS) concerns in asynchronous communication networks.

BACKGROUND OF THE INVENTION

In communication networks, asynchronous transmission of information is often the technique used when communicating information between one or more communication devices within a communication network. Asynchronous transmission is often used when low power devices make up the network. These low power devices can use a low communication duty cycle frame structure in order to minimize the amount of power used while not actively communicating with other network devices, but the use of a low communication duty cycle frame structure often implies that device availability is reduced. In wireless communication networks, a fundamental challenge is maintaining high availability communications while using low power wireless communication devices.

The neuRFon™ device by Motorola is an example of a low power, low cost, small size, and simple wireless device. The neuRFon™ device network is a zero-configuring, self-organizing, asynchronous network containing multiple neuRFon™ devices. For this network, power consumption and cost are two major concerns.

To lower the power consumption, the average communication duty cycle of all the devices in the described network has to be decreased to a minimum. The average communication duty cycle refers to the fraction of time that the wireless device is able to send and receive messages. For the described asynchronous network, the average communication duty cycle may be set so low that the infrequent communications between a transmitter and a destined receiver become a problem. For example, device A may attempt to contact device B, but device B may be not be able to receive messages due to its low average communication duty cycle. This will prevent device A from establishing contact.

A representative low average communication duty cycle frame structure, in which the above problem is illustrated, is shown in FIG. 1. Using this frame structure, a low average communication duty cycle device uses 1 ms to warm up, 1 ms to transmit and receive messages from other devices in its group, and is asleep for the remaining 998 ms of the 1 second cycle. This gives a communication duty cycle of about 0.1%, which is very power efficient.

The problem with this approach is illustrated in FIG. 2. FIG. 2 shows a small network comprising several low power, low average communication duty cycle devices, where each device is represented as a small dot. Referring again to FIG. 2, device A tries to talk to device B. If the low average communication duty cycle frame structure in FIG. 1 is assumed, both A and B devices are able to communicate only 0.1% of the time. If we further make the reasonable assumption that device A and device B don't each have access to the other's time schedule, the probability of device A to establish communication with device B is approximately 0.1%, which is too small for most applications.

Another concern in such networks is packet loss. Network congestion often contributes to this problem, particularly in wireless networks. The behavior of wireless links existing between communication nodes or devices can be highly unpredictable due to the occurrence of fading, interference, and even deployment of the devices in unknown terrains. In such networks, there is an expectation that packet loss will occur as the traffic load on the network increases due to the greater exchange of data packets. This can have a substantial and adverse impact on service quality of the network and can cause the network to only provide best effort support in which there is no guarantee a message will indeed be sent and received.

BRIEF DESCRIPTION OF THE DRAWINGS

The novel features believed characteristic of the invention are set forth in the claims. The invention itself, however, as well as a preferred mode of use, and further objects and advantages thereof, will best be understood by reference to the following detailed description of an illustrative embodiment when read in conjunction with the accompanying drawings, wherein:

DESCRIPTION OF THE INVENTION

Figure 1:
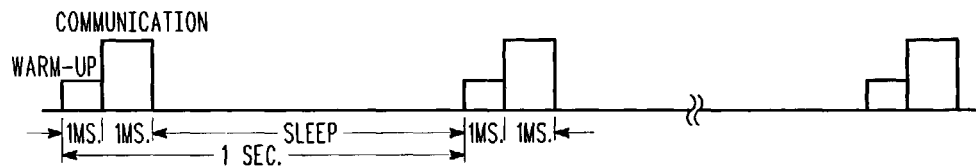
FIG. 1 is a low communication duty cycle frame structure, according to the prior art.
Figure 2:
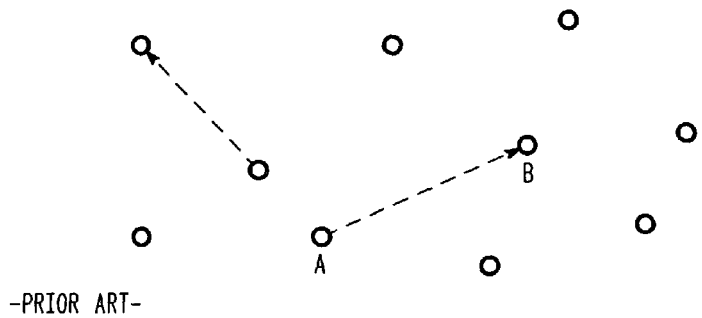
FIG. 2 is a low power communication device network, according to the prior art.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawing.

Figure 3:
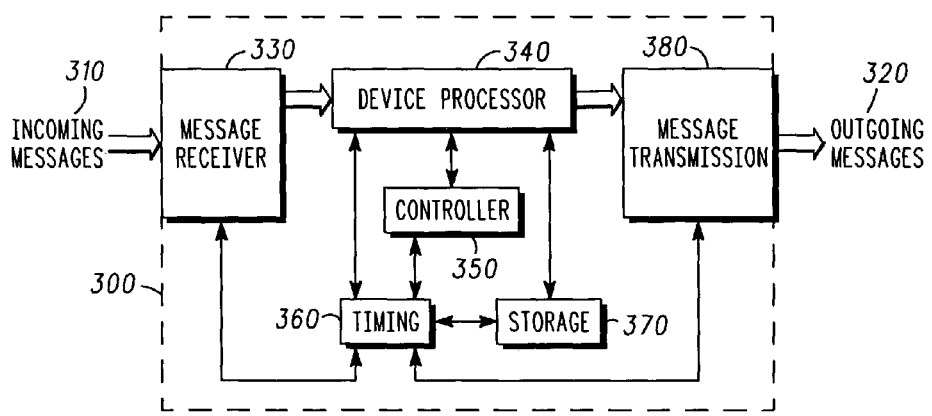
FIG. 3 is a block diagram illustrating the internal functionality of a low power device, in accordance with certain embodiments of the present invention.

Therefore, according to the present invention, a multiple access protocol and structure for communication devices in an asynchronous network is described. This multiple access protocol is applied to the situation in which there are multiple low power communication devices in an asynchronous communication network. These low power communication devices may be neuRFon™ devices, or any similar device capable of low power, low communication duty cycle, and low cost information transmission. Referring now to FIG. 3, a system level block diagram 300 of the internal operation of a low power communication device is shown. Incoming messages 310 are received by a message receiver 330 of the communication device, and are prepared for processing by device processor 340. Device processor 340 interacts with a controller 350, timing 360, and storage 370 in order to allow the communication device to receive and process incoming messages 310 from other communication devices in the network. The timing block 360 allows for synchronization between the communication device and other communication devices in the network, as well as providing a timing reference for internal device functionality. Device transmitter 380 receives messages from device processor 340, prepares messages for transmission, and transmits outgoing messages 320 to other communication devices in the network. One will recognize that the functional blocks illustrated in the system level block diagram 300 of FIG. 3 may be modified or combined without departing from the spirit and scope of a low power communication device that sends messages, receives messages, and processes messages. For instance, it is recognized that the functionality of processor 340 and controller 350 may be combined in a processing and control element if so desired.

In order to keep the power consumption at a minimum, and yet still achieve reliable communication, a mediation device (MD) is introduced. The MD acts as a mediator between communication devices within the network, and is capable of recording and playing back message related information. This is most useful when two communication devices are unable to establish contact. More than one MD may also be used in a large network, where each MD mediates for a group of low-power, low communication duty cycle communication devices. The MD has a relatively high communication duty cycle as compared to the low-power communication devices in the group and is thus able to store and forward messages between two or more low power communication devices in the asynchronous network. Note that the MD functionality may actually be a feature of the low power communication devices in the group. In this case, each low power communication device may be operable as a MD within the asynchronous network, with a low power communication device of the network being randomly chosen to temporarily operate as a MD of the group. This allows the overall network to remain a low power, low cost asynchronous network and each low power wireless device to remain a low communication duty cycle device, except when serving as a MD. Since a low power wireless device is a MD only occasionally, the average communication duty cycle of each low power wireless device can remain low. Distributing MD functionality across all the communication devices in the network also allows the communication devices to use energy mining in order to increase the average communication duty cycle of the communication devices in the network.

During normal asynchronous network operation, each communication device except those serving as MD has a low communication duty cycle frame structure. The communication duty cycle of the MD may be adapted to the design parameters of the network, so that changing the parameters of the MD has an impact on the availability of each communication device within communication range of the MD.

Figure 4:
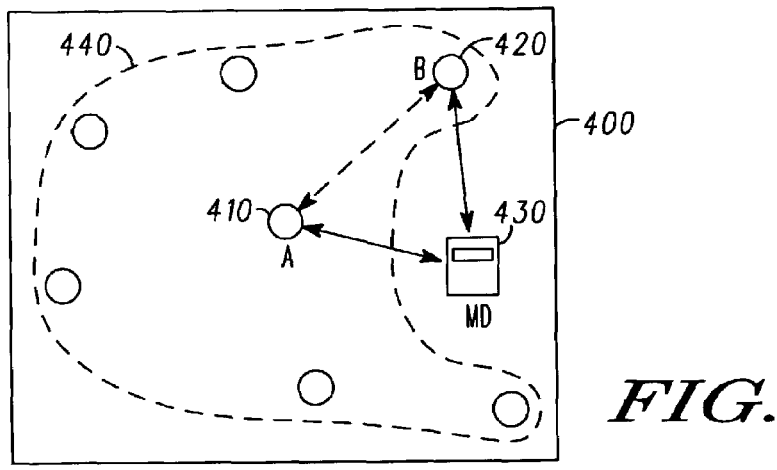
FIG. 4 is a network containing multiple low power devices and a single dedicated Mediation Device (MD), in accordance with certain embodiments of the present invention.

The present invention discloses a method and structure for a low power consumption protocol for low power wireless devices attached to an asynchronous network. Referring to FIG. 4, a simplified representation of a network 400 containing a plethora 440 of low power communication devices 410 and a dedicated MD 430 is shown, according to a first embodiment of the present invention. Each of the low power communication devices 410 of network 400 has a low communication duty cycle and must therefore rely upon dedicated MD 430 for reliable communication. Dedicated MD 430 has a high communication duty cycle in comparison to the non-MD low power devices 410, and can store messages destined for any of low power wireless devices 410 within the group 440.

Figure 5:
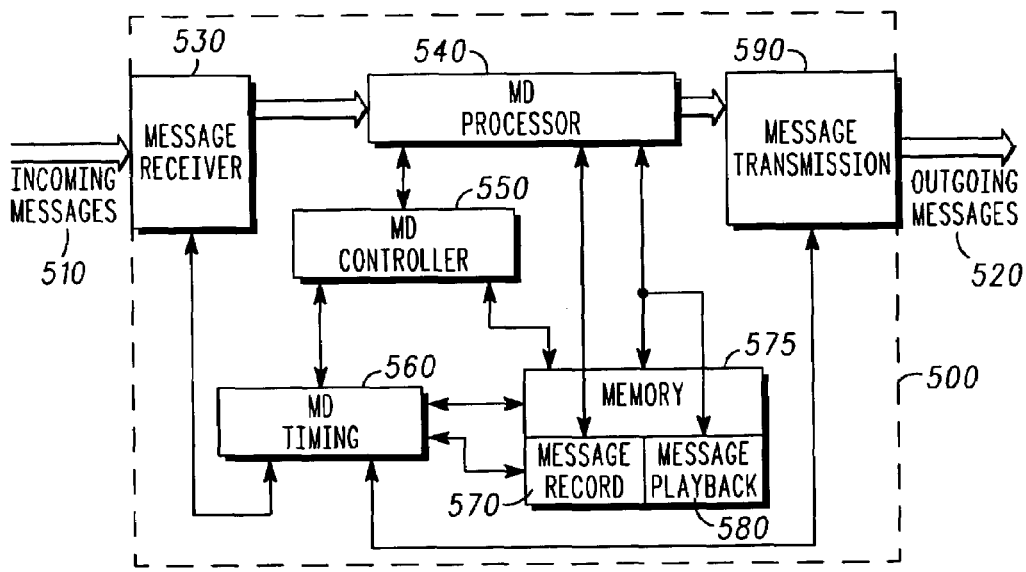
FIG. 5 illustrates the internal functionality of a dedicated MD, in accordance with certain embodiments of the present invention.

Referring now to FIG. 5, a system level block diagram 500 of the internal operation of a dedicated MD device 430 is shown. The dedicated MD device 430 is capable of sending and receiving several types of messages, including the source communication device id, the destination communication device id, the message, time of desired communication, message replay requests, control words, and device status messages. Incoming messages 510 are received by a MD message receiver 530 of the dedicated MD device 430, and are prepared for processing by device processor 540. MD Device processor 540 interacts with a controller 550, timing 560, and storage 575 in order to allow the MD 430 to receive, store, replay and process incoming messages 510 from other communication devices in the network. In addition to non-specific memory, the storage block 575 also includes message playback 580 and message record 570 memory, so that MD processor 540 can mediate requests from communication devices within the network to record messages, playback messages, and save communication device contact information. The timing block 560 allows for synchronization between the MD 430 and other communication devices in the network, as well as provides a timing reference for internal device functionality. Device transmitter 590 receives messages from device processor 540, prepares messages for transmission, and transmits outgoing messages 520 to other communication devices in the network. One skilled in the art will recognize that the functional blocks illustrated in the system level block diagram 500 of FIG. 5 may be modified or combined without departing from the spirit and scope of a low power communication device that sends messages, receives messages, and processes messages. For instance, it is recognized that the functionality of processor 540 and controller 550 may be combined in a processing and control element if so desired.

Figure 6:
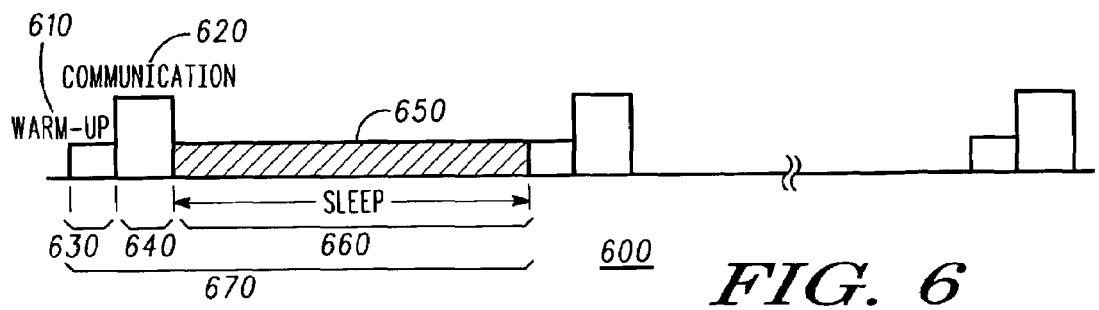
FIG. 6 is a low communication duty cycle frame structure for a low power device, in accordance with certain embodiments of the present invention.

Referring now to FIG. 6, a representative low communication duty cycle frame structure 600 characteristic of the low power, low communication duty cycle devices of the network is shown. A single frame 670 of low communication duty cycle frame structure 600 contains a warm-up block 610, a communication block 620, and a sleep block 650. Warm-up block 610 occurs first chronologically, and is a very small percentage of the overall frame duration. Warm-up block 610 is followed by communication block 620. Communication block 620 is also a small percentage of the overall frame duration. After communication block 620 ends, sleep block 650 begins. Sleep block 650 is a relatively high percentage of the overall frame duration in order to preserve the low communication duty-cycle characteristic of the device. Exemplary values are 1ms for warm-up block 610, 1 ms for communication block 620, and 998 ms for sleep block 650, although these values can be changed significantly without departing from the invention. At the end of frame 670, the three-block cycle 610, 620, 650 is repeated for the next frame. This block order is preserved for all frames in the low communication duty cycle frame structure 400. In the preferred first embodiment, communication block 620 may be further subdivided into a transmit period and a receive period, although it will be clear to one of skill in the art that the communication devices-in the network can have multiple transmit and receive periods within communication block 620. Under normal operation of the first preferred embodiment, the receive period occurs first, followed by a transmit period of equal duration. Under certain situations, such as synchronization between communication devices, the transmit period may occur before the receive period.

Figure 7:
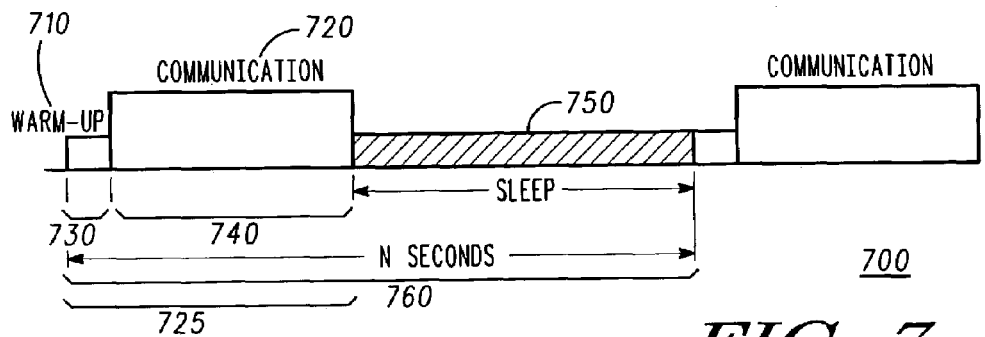
FIG. 7 is a high communication duty cycle frame structure for a dedicated MD, in accordance with certain embodiments of the present invention.

Referring now to FIG. 7, a representative high communication duty cycle frame structure 700 is shown. This high communication duty cycle frame 700 is representative of the dedicated MD communication duty cycle frame, according to the first embodiment. A single frame 725 of low communication duty cycle frame structure 700 contains a warm-up block 710 and a communication block 720. Warm-up block 710 occurs first chronologically, and is a very small percentage of the overall frame duration. Warm-up block 710 is followed by communication block 720. Communication block 720 is a relatively very large percentage of the overall frame duration. At the end of frame 725, sleep cycle 750 begins, which can last for several frames. Exemplary values are 1 ms for warm-up block 710, 2 seconds for communication block 720, and 100 seconds for sleep cycle 750. At the end of sleep cycle 750, warm-up block 710 and communication block 720 are repeated for the next frame. This block order is preserved for all frames in the high communication duty cycle frame structure 700. In the preferred first embodiment, communication block 720 may be further subdivided into a transmit period and a receive period, although it will be clear to one of ordinary skill in the art that the communication devices in the network can have multiple transmit and receive periods within communication block 720. Under normal operation of the first preferred embodiment, the receive period occurs first, followed by the transmit period of equal duration. It should also be noted that the length of the transmit period of communication block 720 should be long enough for the high communication duty cycle device to receive two complete transmit cycles of a low duty cycle device. This will ensure that a dedicated MD will be able to receive a transmission from any communication device within communication range.

Figure 8:
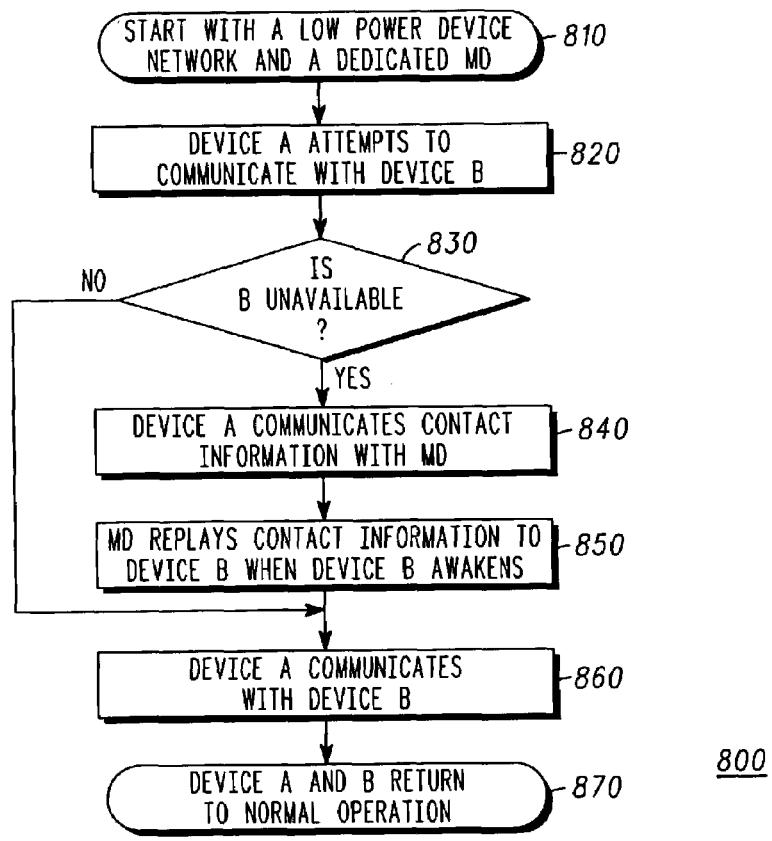
FIG. 8 is a flowchart for dedicated MD operation, in accordance with certain embodiments of the present invention.

Referring now to FIG. 8, a flow diagram 800 for applying the dedicated MD to communication between a communication device A, and a communication device B, according to the first preferred embodiment, is shown. In block 820, device A attempts to communicate with device B. If B is reachable, then decision block 830 evaluates to No and device A establishes communications with device B as shown in block 860. Device A and device B then return to normal operation, as shown in termination block 870. If the answer in decision block 830 is Yes, then device B is not available, and device A communicates contact information with the dedicated MD as shown in block 840. In block 850, dedicated MD replays the contact information for device B when device B is able to communicate. Device B uses this contact information to synchronize communications with device A. Device A is now able to communicate with device B, as shown in block 860. After device A communicates with device B, both devices return to normal operation, as shown in block 870. Note that device A can fail to reach device B when device B is in sleep mode, in transmit mode, out of range, or other similar reasons.

Figure 9:
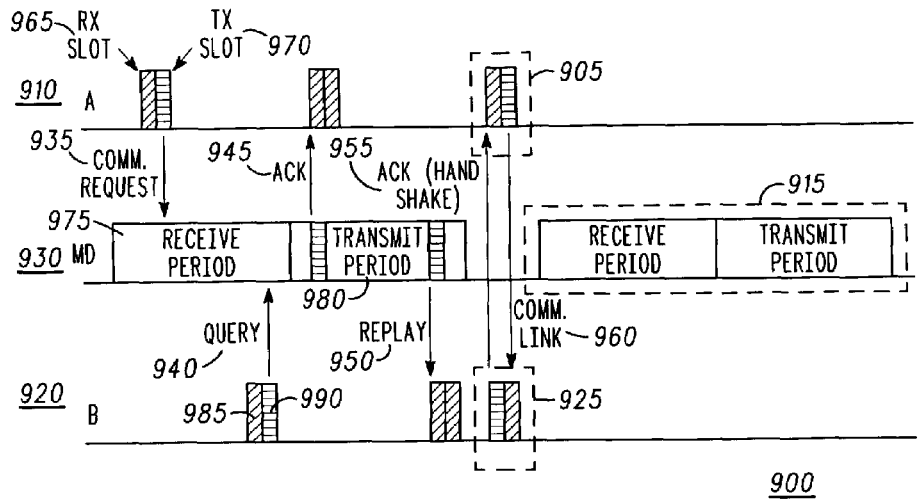
FIG. 9 is a timing diagram for communication between two low power devices and a dedicated MD when a query occurs later than the communication request, in accordance with certain embodiments of the present invention.
Figure 10:
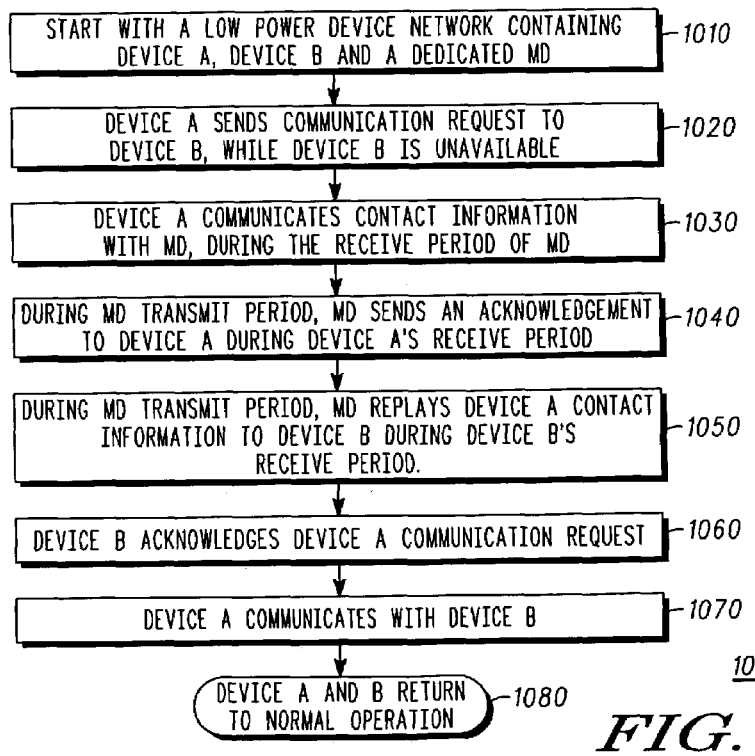
FIG. 10 is a flowchart for communication between two low power devices and a dedicated MD when the query occurs later than the communication request, in accordance with certain embodiments of the present invention.

Referring now to FIG. 9, a more detailed timing diagram is shown for the case described in FIG. 8, according to the first embodiment. As in FIG. 8, device A 910 attempts to communicate with device B 920, but is not successful, so dedicated MD 930 is used to mediate between device A 910 and device B 920 until device B 920 is able to communicate. Device A 910 is a low duty cycle device with a communication period containing a receive slot 965 and a transmit slot 970. Device B 920 is also a low duty cycle device with a communication period containing receive slot 985 and transmit slot 990. Dedicated MD 930 contains a communication period that is much longer than either communication period of device A 910 or device B 920. The communication period of dedicated MD 930 similarly contains a receive period 975 and a transmit period 980. Referring also to FIG. 10, the flowchart for the timing diagram of FIG. 9 is shown. The flow in block 1020 of FIG. 10, as well as the timing diagram of FIG. 9, assume that device A 910 has not been successful in communicating directly with device B 920. So, there is a need for device A 910 to use the dedicated MD 930 to store a communication request with device B 920. As shown in block 1030, device A 910 sends a communication request 935 to dedicated MD 930 during the transmit slot 970 of the communication period of device A 910. Communication request 935 is received by dedicated MD 930 during the receive slot 975 of the communication period of dedicated MD 930. Also during the receive period 975, device B 920 enters its communication period. Upon waking, device B 920 sends a query 940 using transmit slot 990 to dedicated MD 930 to check for messages. Note that both device A 910 and device B 920 are able to communicate with dedicated MD 930 during a single receive slot 975. The duration of receive slot 975 and transmit slot 980 of dedicated MD 930 should be chosen large enough that dedicated MD 930 is able to receive both communication request and query messages. Since MD 930 received communication request 935 from device A 910 prior to the query 940 from device B 920, during the transmission slot 980 of the communication period of dedicated MD 930 dedicated MD 930 first sends an acknowledgement 945 to device A 910 during receive slot 965 in the next communication period of device A 910, as indicated in block 1040. Dedicated MD 930 then sends a replay message 950 to device B 920 during the same transmit slot 980 of the communication period of dedicated MD 930, as indicated in block 1050. In the first preferred embodiment, the communication period of each communication device in the network occurs with a fixed period, so that dedicated MD 930 is able to sync with device B 920 without device B 920 sending synchronization information. However, other implementations of the second embodiment could require each communication device in the network to transmit explicit synchronization information to dedicated MD 930, so that the query message would contain synchronization information. Device B 920 now has enough information to enable communications with device A 910 without the use of dedicated MD 930. In order to synchronize with device A, device B uses timing information provided in the communication request 935 of device A 910, and swaps communication slots so that the transmit slot 990 precedes the receive slot 985 of device B 920. As shown in block 1060, device B 920 then sends an acknowledgement 955 to device A during the receive slot 965 of the communication period of device A. As shown in block 1070, device A 910 is now able to communicate a message 960 to device B 920 during the transmit slot 970 of device A 910 and the receive slot 985 of device B 920. Once the communication between device A 910 and device B 920 is complete, device A 910 and device B 920 return to normal operation, as shown in block 1080.

Figure 11:
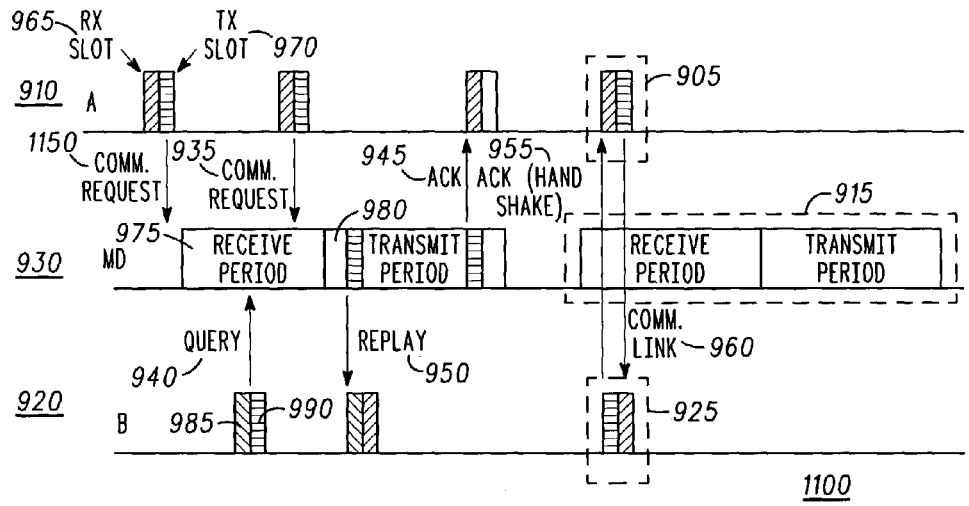
FIG. 11 is a timing diagram for communication between two low power devices and a dedicated MD when the query occurs earlier than the communication request, in accordance with certain embodiments of the present invention.
Figure 12:
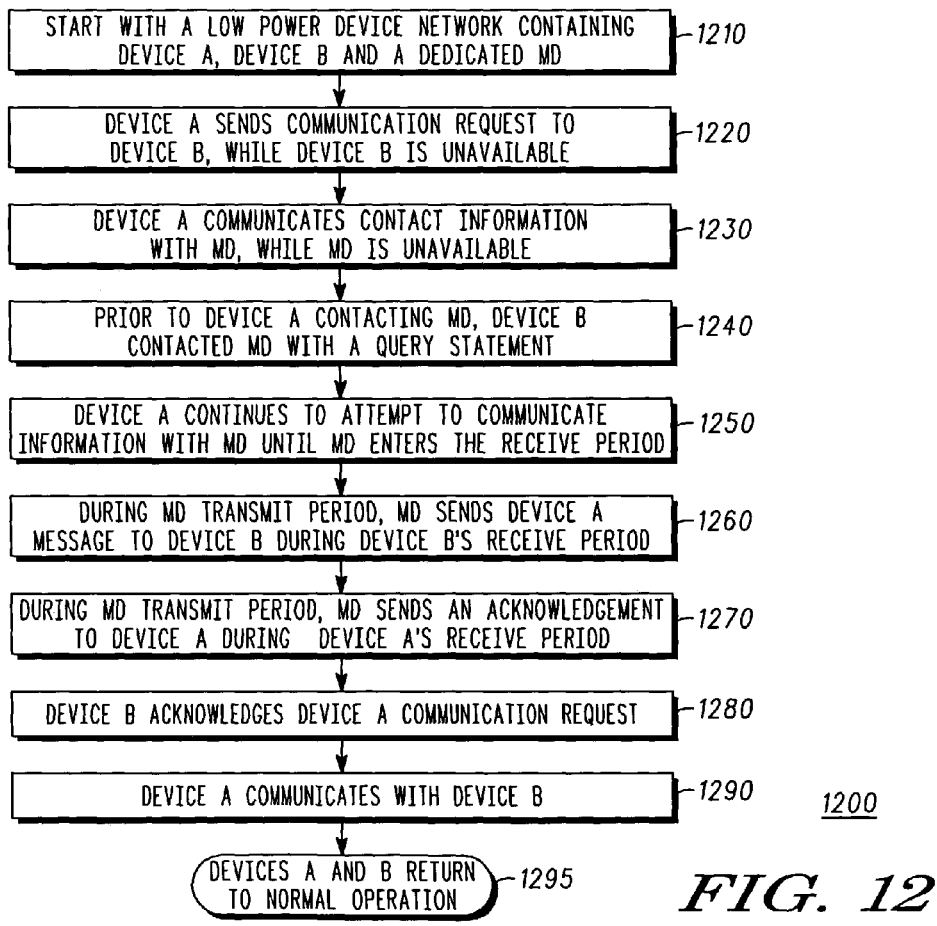
FIG. 12 is a flowchart for communication between two low power devices and a dedicated MD when the query occurs earlier than the communication request, in accordance with certain embodiments of the present invention.

The discussion above referring to FIG. 9 and FIG. 10, illustrated the sequence of communication operations and timing flow for the case in which the query from device B 920 is later than the communication request from device A 910. It is also possible for the query of device B 920 to precede the communication request of device A 910. This scenario is illustrated in the timing diagram of FIG. 11, and the flowchart of FIG. 12. The sequence of operations shown in FIG. 12 is identical to those in FIG. 9, except that device A 910 first attempts to communicate a communication request 1150 with dedicated MD 930 during a time that dedicated MD 930 is unavailable, as in block 1230. Since the dedicated MD 930 is not available, device A 910 has to wait until a communication period in which dedicated MD 930 has an active receive period 975. This delay means that device B 920 sends query 940 to the receive slot 975 of dedicated MD 930 prior to the communication request 935 of device A 910, as in block 1240. It is important to note that since both the transmit slot 975 and receive slot 980 of dedicated MD 930 are as long as two transmit periods of device A 910 or device B 920, during the transmit slot of dedicated MD 930, dedicated MD is able to replay message 950 to device B 920 and acknowledge 945 device A 910. This allows the handshake between device A 910 and device B 920 to proceed as in block 1060-1080. So, the ordering of the communication request 935 and the query 940 within a single receive slot 975 and the ordering of replay 950 and acknowledgement 945 within a single transmit slot 980 of dedicated MD 930 does not affect establishment of communications between device A 910 and device B 920.

Figure 13:
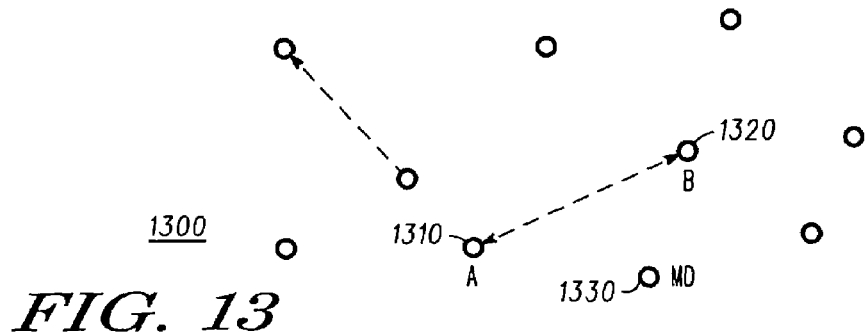
FIG. 13 is a network containing multiple low power devices and an additional low power device functioning as a MD, in accordance with certain embodiments of the present invention.

Instead of using dedicated MD 930, the functionality of a MD may be coupled to each of the plethora 440 of low power communication devices. Referring now to FIG. 13, a network 1300 containing a plethora of low power communication devices is shown, according to a second embodiment of the present invention. Each low power communication device of the low power communication devices can function as MD. In FIG. 13, low power communication device 1330 is functioning as a MD. Note that low power communication device 1330 is not a dedicated MD 930. The low power communication device of the low power communication devices that will function as MD is selected at random.

There are several approaches that may be used to select the next MD. The MD could be selected at random when the low power communications device acting as MD is not able to act as MD any longer. If each MD uses a randomly generated initial phase offset t0, then the distribution of MD functionality across the low power communication devices within the network should be uniform. This selection process will prevent collisions between two low power communications devices attempting to concurrently act as MD, but it requires coordination amongst the low power communication devices within the network. A second approach, and the one used in the second preferred embodiment, is to let each low power wireless device randomly determine when it will act as MD. In the case of two low power communication devices acting as MD, a collision avoidance strategy will be used to ensure only one MD is within communication range of a low power communication device.

Figure 14:
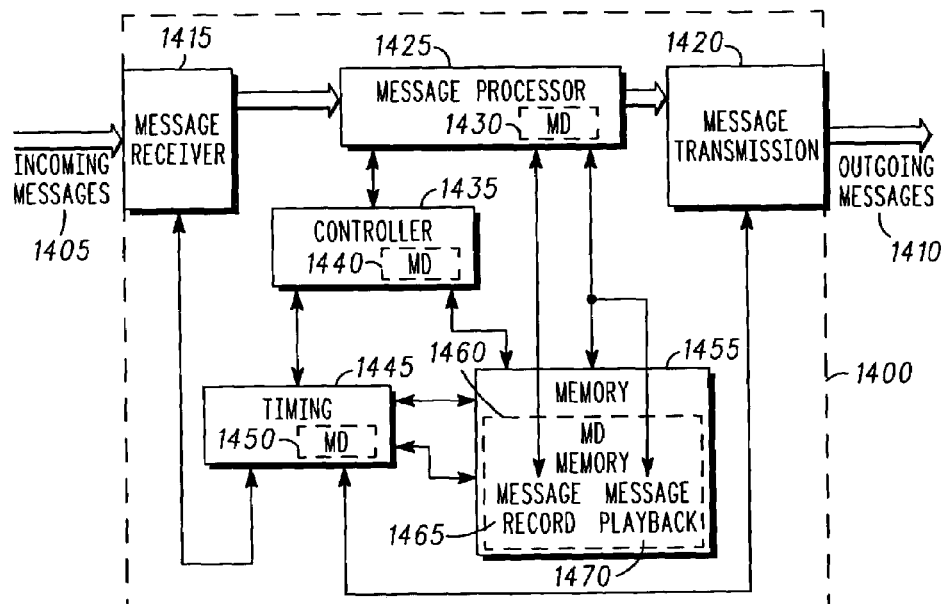
FIG. 14 is the internal functionality of a low power device operable as a MD, in accordance with certain embodiments of the present invention.

Referring now to FIG. 14, a system level block diagram 1400 of the internal operation of a low power communication device with MD functionality is shown according to the second embodiment of the invention. The low power communication device 1400 is capable of supporting specialized functionality for sending and receiving several types of MD messages, including the source communication device id, the destination communication device id, the message, time of desired communication, message replay requests, control words, and device status messages. This specialized functionality is in addition to the normal operational mode representative of the plethora of low power communication devices in the network. Incoming messages 1410 are received by message receiver 1415 of communication device 1400, and are prepared for processing by message processor 1425. Message processor 1425 contains further MD processing functionality 1430 that interacts with the MD functionality of a MD controller 1440, MD timing 1450, and MD memory 1460 in order to allow the communication device 1400 to receive, store, replay and process incoming messages 1405 from other communication devices in the network while acting as MD. Note that the communication device 1400 also contains the functionality illustrated in FIG. 5, but with additional MD functionality shown in dashed boxes. The MD memory 1460 of storage block 1455 also includes message playback 1470 and message record 1465 memory, so that MD processor 1430 can mediate requests from communication devices within the network to record messages, playback messages, and save communication device contact information. The MD timing block 1450 allows for synchronization between the communication device 1400 and other communication devices in the network, when communication device 1400 is acting as MD. Device transmitter 1420 receives messages from device processor 1425, prepares messages for transmission, and transmits outgoing messages 1410 to other communication devices in the network. One skilled in the art will recognize that the functional blocks illustrated in the system level block diagram 1400 of FIG. 14 may be modified or combined without departing from the spirit and scope of a low power communication device that sends messages, receives messages, and processes messages. In particular, it should be noted that the MD functionality shown in FIG. 14 may be further combined or isolated from the non-MD operation of communication device 1400, so long as the device 1400 is operable as a MD to the network.

Figure 15:
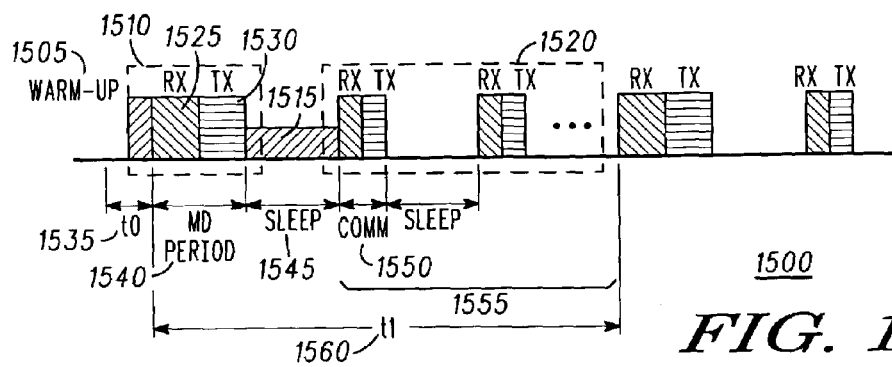
FIG. 15 illustrates a low communication duty cycle frame structure for a low power device functioning as a MD, in accordance with certain embodiments of the present invention.

Referring now to FIG. 15, a representative low communication duty cycle frame structure 1500 of low power communication device 1400 functioning as MD is shown. Low communication duty cycle frame structure 1500 contains several cycles of operation in which each cycle contains a plethora of frames that are repeated multiple times. A first frame of the plethora of frames of low communication duty cycle frame structure 1500 contains a random delay t0 block 1535, a warm-up block 1505, and a communication block 1510. The random delay has duration t0 1535, where t0 is between 0 and the duration of a single transmit or receive period. This delay randomizes the start time of the communication devices in the network, so that the probability of multiple devices to function as MD concurrently is reduced. Warm-up block 1505 occurs next chronologically, and is a very small percentage of the overall frame duration. Warm-up block 1505 is followed by communication block 1510. Note that communication block 1510 and warm-up block 1505 directly follow the random delay t0 1535. However, it is also feasible for communication block 1510 and warm-up block 1505 to be delayed a random amount during the start of the next cycle of operation. In other words, the timing of communication block 1510 within the sequence of cycles is not constrained to be periodic. Communication block 1510 is a large percentage of the overall frame duration, and further comprises a receive slot 1525 and a transmission slot 1530. In the second preferred embodiment, the one receive slot 1525 precedes the one transmit slot 1530, although the order could be switched. Also, one of ordinary skill in the art will recognize that communication block 1510 could contain several transmit and receive slots in various arrangements. Also, although transmit slot 1530 occurs directly before or directly after receive slot 1525, the hardware contained in the transmitter and receiver will require some time to switch between the transmit and receive modes. The duration of the switching time can be dependent on the switching speed of the hardware in the communication devices, or it could be determined by a user specified parameter in the communication device processor.

After communication block 1510 ends, a second frame having a duration roughly one half of communication block 1510 begins. Second frame contains one sleep block 1515. Sleep block 1515 is a very high percentage of the overall frame duration. At the end of the second frame the low power communication device 1400 resumes low communication duty cycle operation starting with a third frame of the plethora of frames. The low communication duty cycle frame structure 1500 is shown in FIG. 6. Low communication duty cycle operation occurs for several frames of the plethora of frames of low communication duty cycle frame structure 1500. The duration of the first cycle of low communication duty cycle frame structure 1500 is a random number that is generated by the communication device 1400 at the start of the delay block 1535.

At the conclusion of the first cycle, the entire framing sequence just described is repeated until low power communication device 1400 stops functioning as MD. The decision to stop functioning as MD is made solely by the low power communication device 1400 in the second preferred embodiment, although it is also possible to coordinate the role of MD among several low power communication devices. Note that low power communication device 1400 contains the ability to generate and store random or pseudo-random numbers. These numbers could be generated by MD processor 1430, and stored in MD memory 1460.

Figure 16:
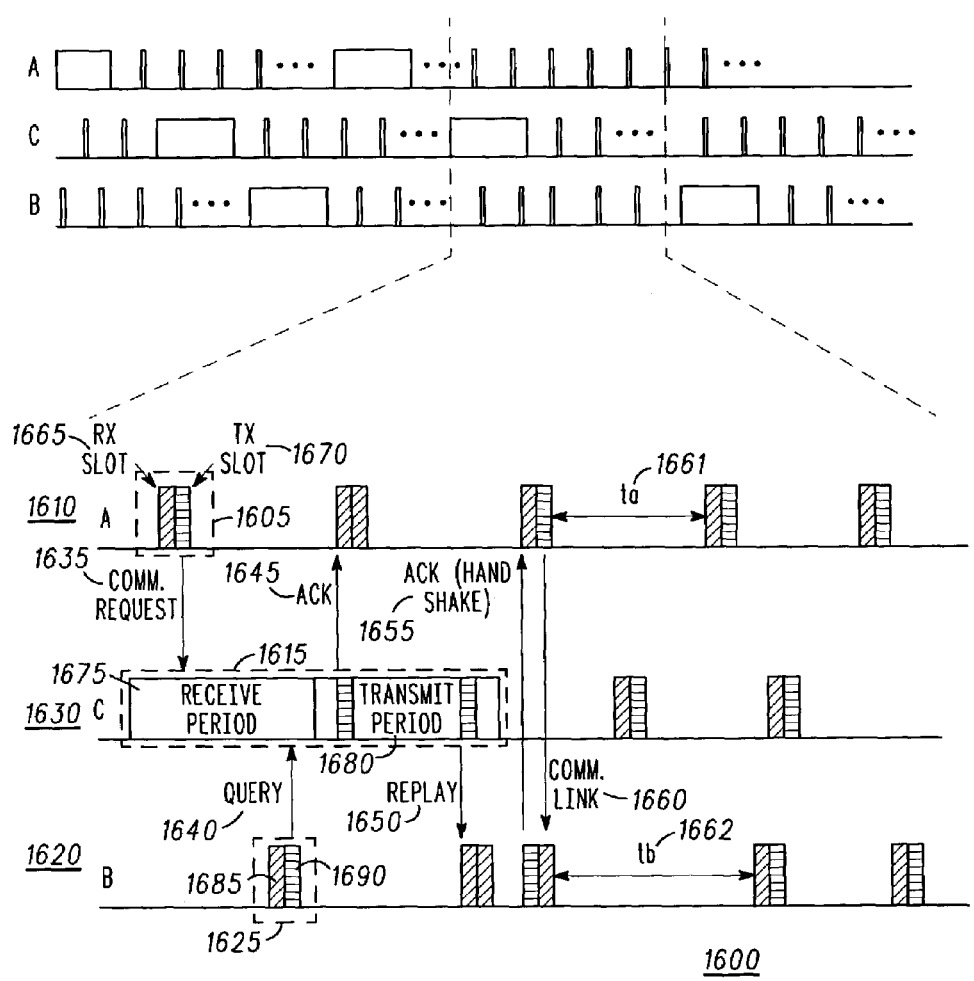
FIG. 16 is a timing diagram for communication between two low power devices and a third low power device acting as MD when the query occurs later than the communication request, in accordance with certain embodiments of the present invention.
Figure 17:
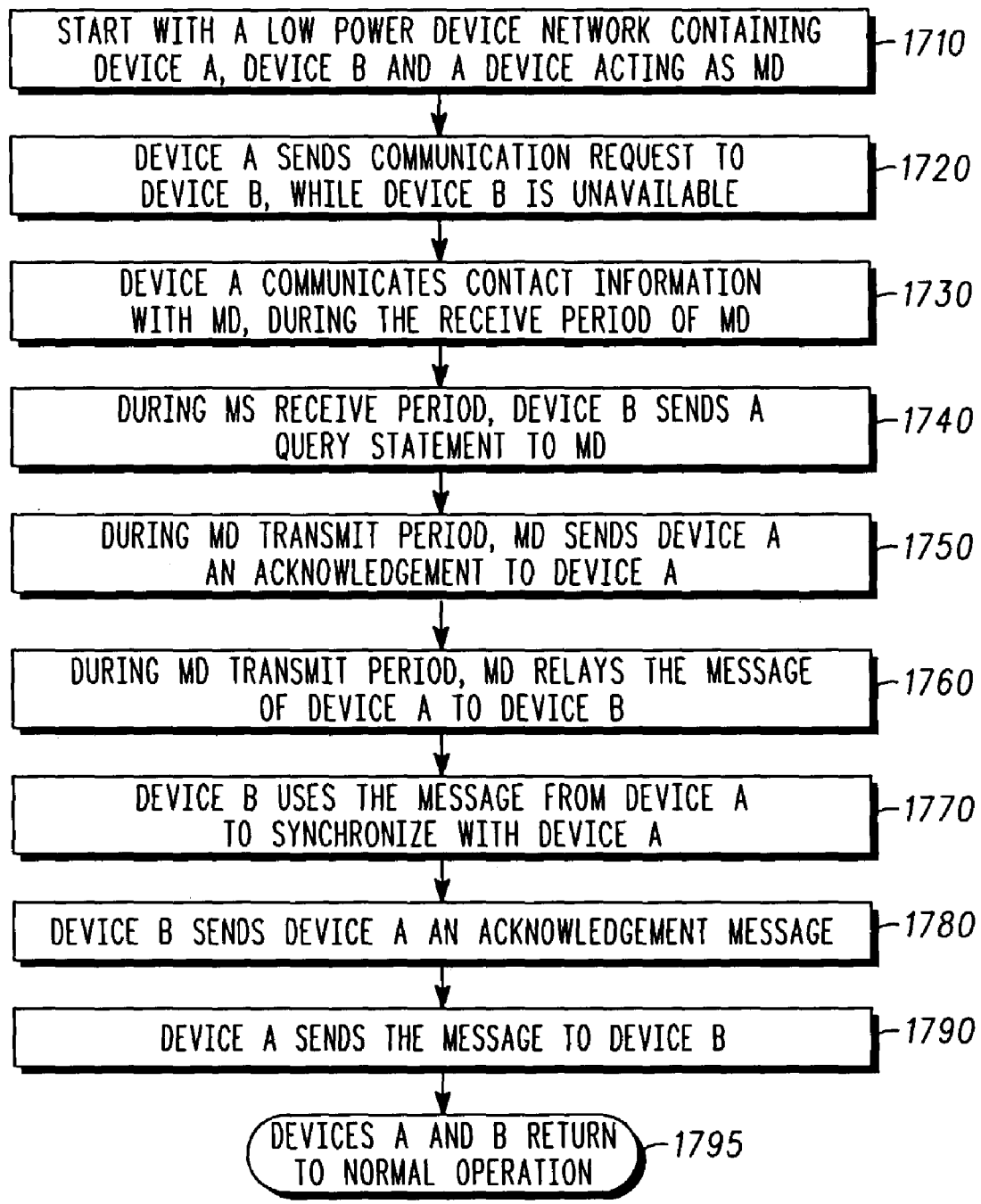
FIG. 17 is a flowchart of the communication between two low power devices and a third low power device acting as MD when the query occurs later than the communication request, in accordance with certain embodiments of the present invention.

Referring now to FIG. 16, a detailed timing diagram for a device A 1610 attempting to send a communication request to a device B 1630 using a device C 1620 acting as MD, according to the second embodiment, is shown. As in FIG. 9, device A 1610 first attempts to communicate with device B 1630 prior to a query request 1660 of device B 1630. The communication sequence shown in FIG. 16 for the second embodiment is identical to the communication sequence shown in FIG. 9 for the first embodiment. A difference between the FIG. 9 and FIG. 16 is that device C 1630 is a low power communication device acting as MD. Device A 1610 is a low duty cycle device with a communication period containing a receive slot 1665 and a transmit slot 1670. Device B 1620 is also a low duty cycle device with a communication period containing receive slot 1685 and transmit slot 1690. Device C 1630 contains a communication period that is much longer than either communication period of device A 1610 or device B 1620. The communication period of device C 1630 similarly contains a receive period 1675 and a transmit period 1680. Referring also to FIG. 17, the flowchart for the timing diagram of FIG. 16 is shown. The flow in block 1730 of FIG. 17, as well as the timing diagram of FIG. 16, assume that device A 1610 has not been successful in communicating directly with device B 1620. So, there is a need for device A 1610 to use the device C 1630 to store a communication request with device B 1620. As shown in block 1730, device A 1610 sends a communication request 1635 to device C 1630 during the transmit slot 1670 of the communication period of device A 1610. Communication request 1635 is received by device C 1630 during the receive slot 1675 of the communication period of device C 1630. Also during the receive period 1675, device B 1620 enters its communication period. Upon waking, device B 1620 sends a query 1640 using transmit slot 1690 to device C 1630 to check for messages. Note that both device A 1610 and device B 1620 are able to communicate with device C 1630 during a single receive slot 1675. The duration of receive slot 1675 and transmit slot 1680 of device C 1630 should be chosen to be large enough that device C 1630 is able to receive both communication requests and query messages. Since MD 1630 received communication request 1635 from device A 1610 prior to the query 1640 from device B 1620, during the transmission slot 1680 of the communication period of device C 1630, device C 1630 first sends an acknowledgement 1645 to device A 1610 during receive slot 1665 in the next communication period of device A 1610, as indicated in block 1750. Device C 1630 then sends a replay message 1650 to device B during the same transmit slot 1680 of the communication period of device C 1630, as indicated in block 1760.

Device B 1620 now has enough information to enable communications with device A 1610 without the use of device C 1630. In order to synchronize with device A, device B uses timing information provided in the communication request 1635 of device A 1610, and swaps communication slots so that the transmit slot 1690 precedes the receive slot 1685 of device B 1620. As shown in block 1780, device B 1620 then sends an acknowledgement 1655 to device A during the receive slot 1665 of the communication period of device A. As shown in block 1790, device A 1610 is now able to communicate a message 1660 to device B 1620 during the transmit slot 1670 of device A 1610 and the receive slot 1685 of device B 1620. Once the communication between device A 1610 and device B 1620 is complete, device A 1610 sleeps for a randomly generated duration ta 1661 and device B 1620 sleeps for a randomly generated duration tb 1662. Device A 1610 and device B 1620 then return to normal operation, as shown in block 1795.

Figure 18:
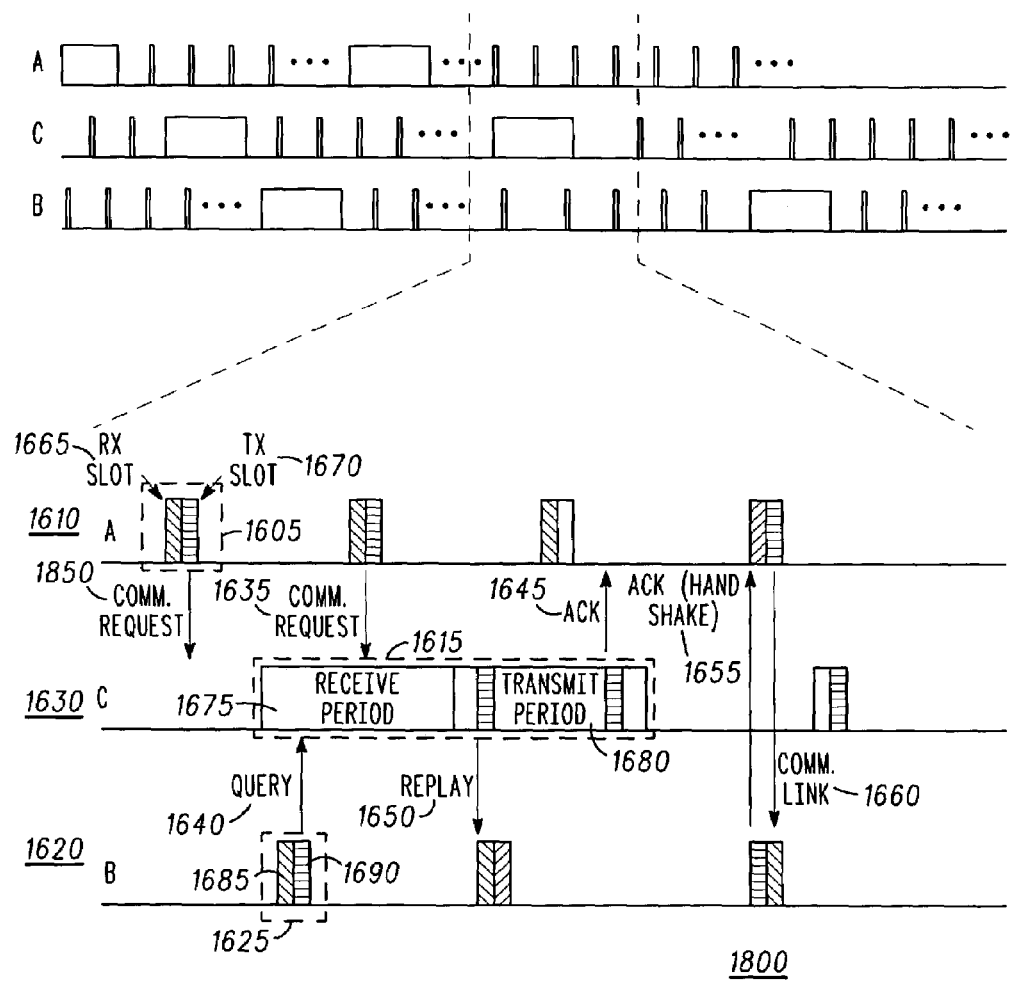
FIG. 18 is a timing diagram for communication between two low power devices and a third low power device acting as MD when the query occurs earlier than the communication request, in accordance with certain embodiments of the present invention.
Figure 19:
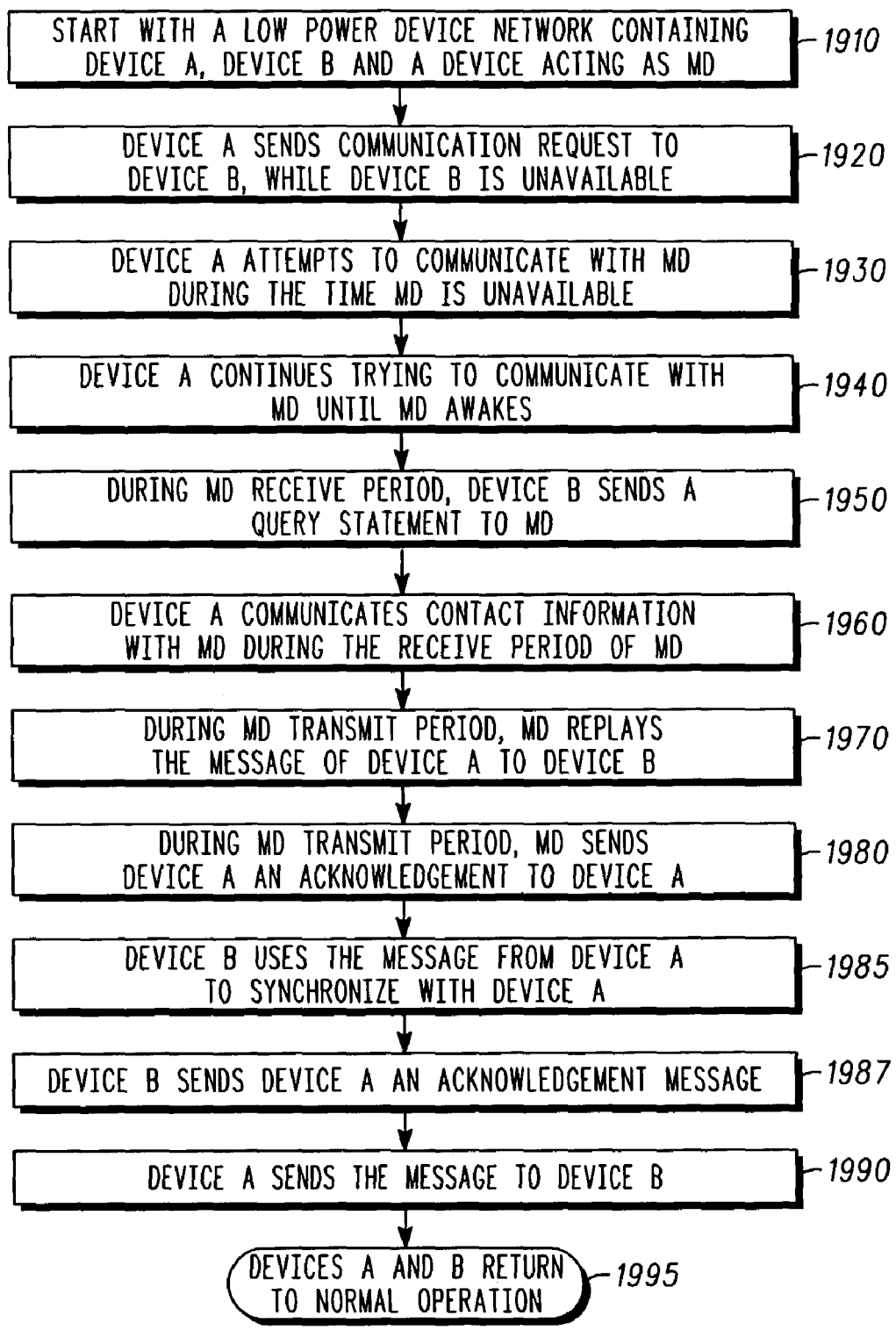
FIG. 19 is a flowchart for the communication between two low power devices and a third low power device acting as MD when the query occurs earlier than the communication request, in accordance with certain embodiments of the present invention.

The discussion above referring to FIG. 16 and FIG. 17, illustrated the sequence of communication operations and timing flow for the case in which the query from device B 1620 is later than the communication request from device A 1610, according to the second embodiment. It is also possible for the query of device B 1620 to precede the communication request of device A 1610. This scenario is illustrated in the timing diagram of FIG. 18, and the flowchart of FIG. 19. The sequence of operations shown in FIG. 18 is similar to those in FIG. 11, except that device C 1630 is a low power communication device functioning as a MD, rather than the dedicated MD 930 shown in FIG. 11. Since the device C 1630 is not available, the first communication request 1850 of device A 1610 is not received as shown in block 1930, and device A 1610 has to wait until a communication period in which device C 1630 has an active receive period 1675, as shown in block 1940. This delay means that device B 1620 sends query 1640 to the receive slot 1675 of device C 1630 prior to the communication request 1635 of device A 1610, as in block 1950. It is important to note that since both the transmit slot 1675 and receive slot 1680 of device C 1630 are as long as two transmit periods of device A 1610 or device B 1620, during the transmit slot of device C 1630, device C is able to replay message 1650 to device B 1620 and acknowledge 1645 device A 1610. This allows the handshake between device A 1610 and device B 1620 to proceed as in block 1985-1990. So, the ordering of the communication request 1635 and the query 1640 within a single receive slot 1675 and the ordering of replay 1650 and acknowledgement 1645 within a single transmit slot 1680 of device C 1630 does not affect establishment of communications between device A 1610 and device B 1620. Once the communication between device A 1610 and device B 1620 is complete, device A 1610 sleeps for a randomly generated duration ta 1661 and device B 1620 sleeps for a randomly generated duration tb 1662.

Figure 20:
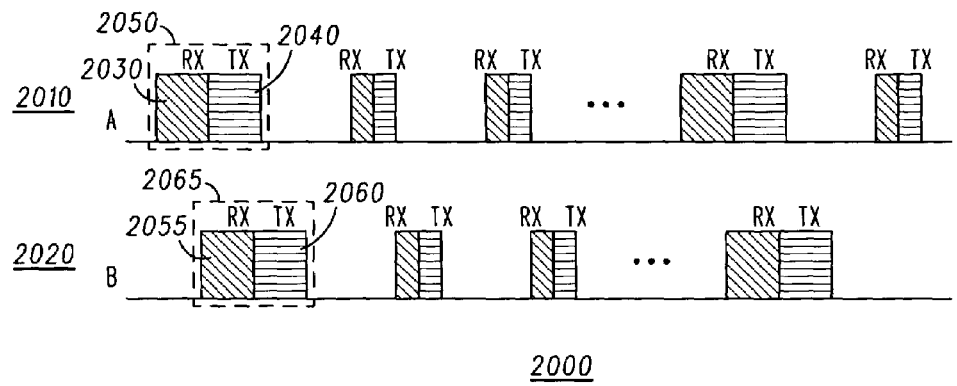
FIG. 20 is a timing diagram illustrating a collision between two low power devices acting as MD when a collision avoidance strategy is not used, in accordance with certain embodiments of the present invention.

For the second embodiment of the present invention, it is possible for two communication devices within the network to independently decide to function as MD's at the same time. If this occurs, then it is possible that the transmit periods of the two devices of the two devices overlap and a collision results. This situation is illustrated in FIG. 20. Device A 2010 first starts to function as MD. A short time later, a second device B starts to function as MD. When transmission slot 2040 of device A 2010 overlaps transmission slot 2060 of device B 2020, the two transmitters interfere and communications capability is degraded. Note that the issue of collision is only a problem when the transmitters in the communication devices within the network occupy overlapping frequency bands and the communicated bit rate/bandwidth is high. If the transmitter data is modulated using a spreading waveform, then the communication devices could occupy the same frequency band and collisions could be less of an issue. According to the preferred second embodiment, each of the communication devices are single-channel devices using the same transmission frequency, so that the collision issue must be addressed.

Figure 21:
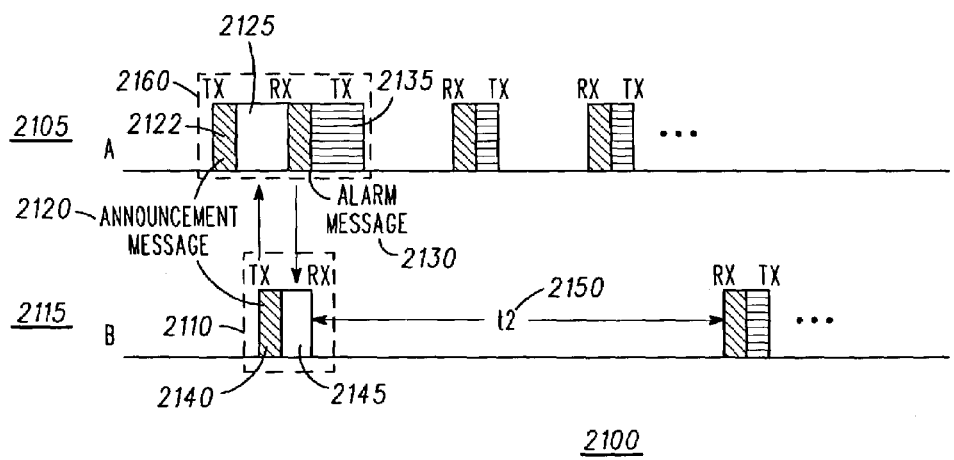
FIG. 21 is a timing diagram illustrating the collision avoidance strategy between two low power devices acting as MD, in accordance with certain embodiments of the present invention.
Figure 22:
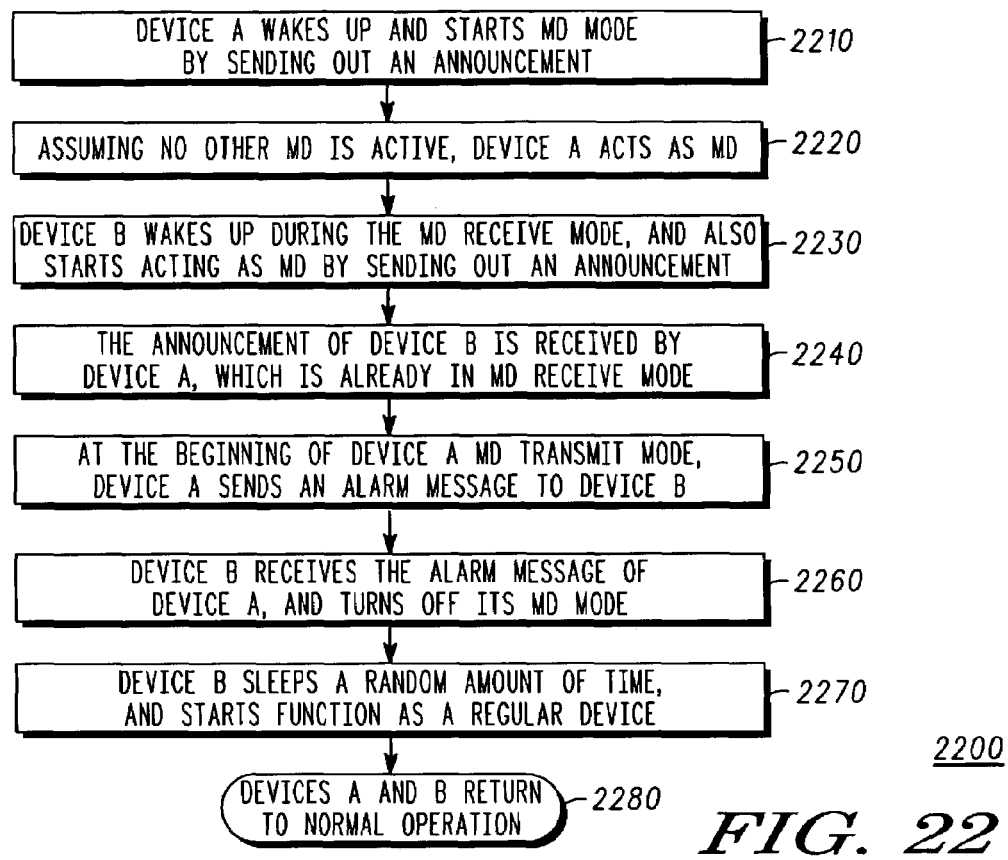
FIG. 22 is the collision avoidance strategy flowchart, in accordance with certain embodiments of the present invention.

Referring now to the timing diagram of FIG. 21, and the flowchart of FIG. 22, a collision avoidance strategy is described according to the second embodiment of the present invention. Device A 2105 is randomly selected as MD prior to device B 2115. At the start of the MD mode of device A 2105, device A transmits announcement message 2120 (block 2210) in a very short duration transmission slot 2122, and then switches to receive slot 2125 of communication period 2160 (block 2220). Device B 2115 is then randomly selected as MD, and device B 2115 sends out announcement message 2120 (block 2230) in a very short duration transmission slot 2140 prior to switching to receive slot 2145 of communication period 2160. Device A receives the announcement message 2120 of device B 2115 (block 2240) during receive slot 2125, and generates alarm message 2130 during it's next transmit period 2135 (block 2250). Device B 2115 receives this alarm message 2130 during receive period 2145, and immediately stops acting as MD (block 2260). Device B 2115 then sleeps a random amount of time t2 to prevent future collisions and resumes operation as a normal low power communication device (block 2270). Instead of sleeping for t2 seconds, device B 2115 could wait until the end of the MD communication period of device A 2105. At this time, device B 2115 functions as a MD, since device A 2105 is not in communication period 2160.

According to the second preferred embodiment, the random initial offset to 1535 is between 0 and 1 sleep period 1545, the amount of delay ta 1661 and tb 1662 are between 0 and 1 sleep period 1515, and the cycle time t1 1560 follows the inequality, $0.5T<t1<1.5T$, where T is the average frequency of the communication period of a communication device acting as MD.

The second embodiment of the present invention presents a protocol and structure for a network of low power communication devices to improve the reliability of inter-device communication through the use of a Mediation Device (MD). One issue with this approach is the reliability when the number of communication devices in the network is small. As an example, if the network contains only five communication devices, and the MD communication cycle of each is 1000 seconds (t1), then the average latency will be roughly 200 seconds. One way to reduce the latency is to constrain all nodes to communicate within a specified time window.

Figure 23:
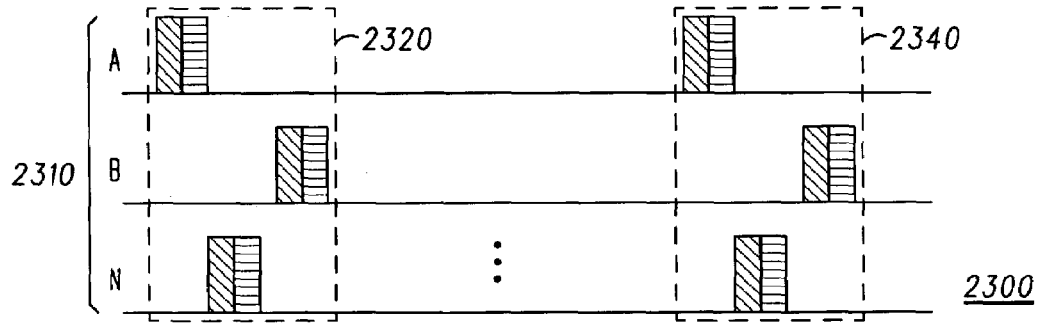
FIG. 23 is a timing diagram for a multiple access scheme for a small network of low power devices, wherein each device is operable as a MD, in accordance with certain embodiments of the present invention.

Referring to FIG. 23, a multiple access scheme in which N communication devices 2310 are in the network, according to a third embodiment of the present invention. Each communication device of the N communication devices is constrained to receive and transmit information within a window 2320 of duration Tw seconds. Duration Tw is selected from the size of the network as determined by the number of communication devices in the network.

For example, for a network with five communication devices operating within a t1 period of 1000 seconds, the average latency is 200 seconds. If the communication cycle t1 is reduced to 300 seconds, the average latency is reduced by a factor of three. If the duration Tw of window 2320 is smaller than the communication period of the communication device, the duration of the communication period must be reduced to fit within window 2320. Reducing the duration of the communication period increases the likelihood of communication devices moving out of communication range without the knowledge of communication device acting as MD. Also, new communication devices entering the network will not be recognized unless their communication period lies within the window 2320.

Figure 24:
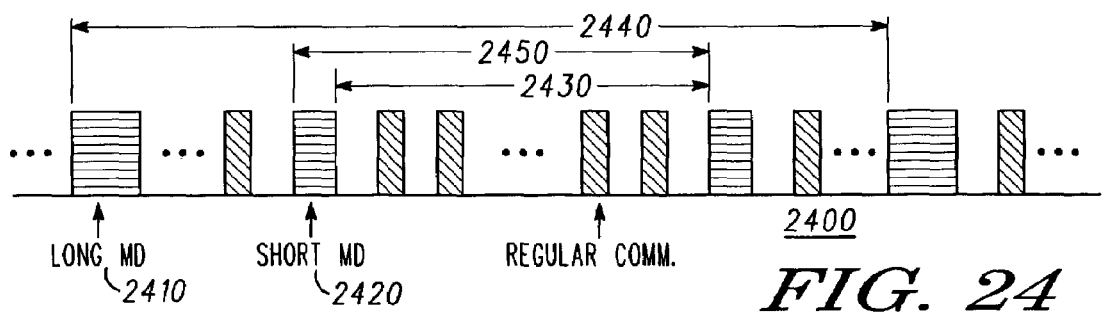
FIG. 24 is a low communication duty cycle frame structure for a multiple access scheme for a small network of low power devices, wherein each device is operable as a MD, in accordance with certain embodiments of the present invention.

One solution to this is illustrated in FIG. 24, according to the third embodiment of the present invention. The timing diagram 2400 of FIG. 24 shows a communication device which has a shortened communication period so that the communication device is able to communicate within window 2420. In order to check for new communication devices, or recognize the loss of existing communication devices, a long communication period 2410 is occasionally used when the communication device is acting as MD. This long communication period 2410 is followed by the low power communication duty cycle 2430 structure of FIG. 6, and additional short MD communication periods 2420. With the exception of the long communication periods 2410, the communication device has essentially the same low communication duty cycle frame structure illustrated in FIG. 15 of the second embodiment.

As an example of the third embodiment, a long communication period 2410 of 2 seconds, a short communication period 2420 of 200 ms, and the normal low communication duty cycle mode with a communication period of 2 ms is used. The frequency of the long communication period 2410 is 1500 seconds, the frequency of the short communication period is 300 seconds, and the frequency of the normal communication period is 1 second. This leads to a duty cycle of about 0.4%.

It is noted that the communication device described herein may be a NeuRFon® device or any suitable communication device having similar operating characteristics.

The use of mediation devices in an asynchronous network can be further leveraged through the use of new protocols to provide a better than best effort service in the network. These protocols invoke adaptive quality of service (QoS) mechanisms to capitalize on the strength and flexibility provided to the network by the presence of one or more MDs, as described above. Expanded functionality of the MD includes control information messaging and service differentiation for the purpose of improving global QoS of the network. The improved QoS protocols are applicable to both dedicated and distributed mode MDs and are implemented and controlled by the processing and control blocks of the MD (referred to by reference numerals 340, 350, 540, 550 and discussed above). As previously noted, the processing and control functions may reside in the same or separate parts of the MD.

In accordance with certain embodiments of the present invention, a method for providing improved quality of service (QoS) control in an asynchronous network having a mediation device and a plurality of communication devices is envisioned. Quality of service (QoS) parameters, relevant to a communication request received from a sender communication device to send a communication to a target communication device, are analyzed by a MD. Analysis by the MD allows it to make a determination about whether the service request can be serviced or not. If it is determined that the service request can be serviced, i.e. is supportable by a target device, than the MD sends the communication message on to its intended recipient. A decision to honor the communication request may optionally result in an acknowledgement message being communicated by the MD to the sender communication device, the target communication device or both. Alternately, a decision that the communication request cannot be serviced, may result in the MD sending a service message indicating the same to the sender communication device.

As will become clear, the decision about whether the communication request can be serviced may be based upon one or more types of QoS parameters, which can include sender QoS (SQoS) parameters relevant to certain communication criteria of the sending communication device, target QoS (TQoS) parameters relevant to the ability of the target communication device to receive the communication intended for it, mediation device QoS (MDQoS) parameters descriptive of the ability of the MD itself to service the communication request, and network QoS (NQoS) parameters indicative of health of the network and thus its ability to support the communication request.

Figure 25:
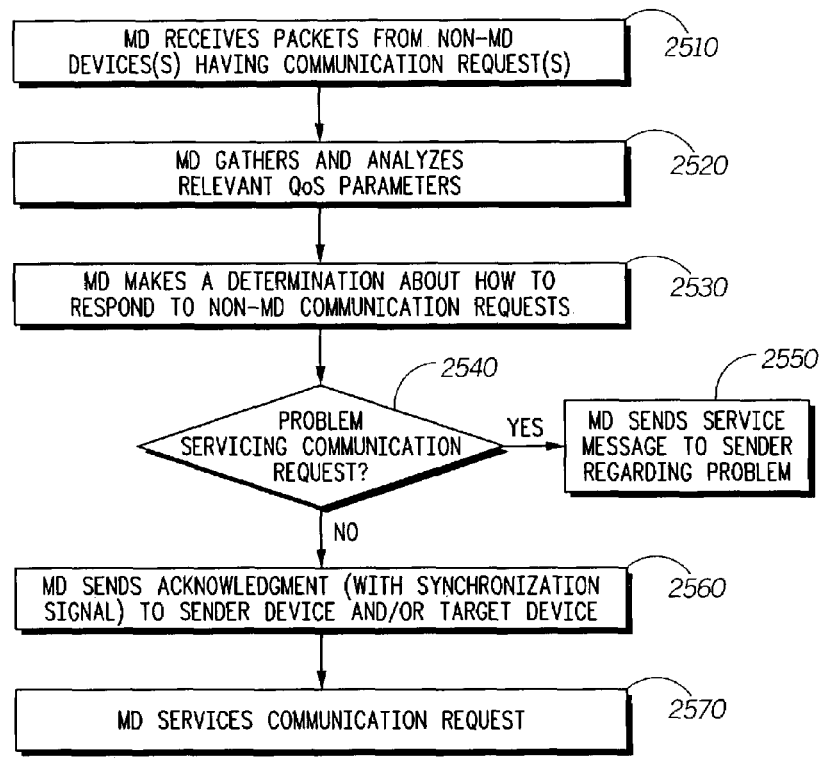
FIG. 25 is a flowchart illustrating an approach for achieving improved QoS performance in an asynchronous network, in accordance with certain embodiments of the present invention.
Figure 26:
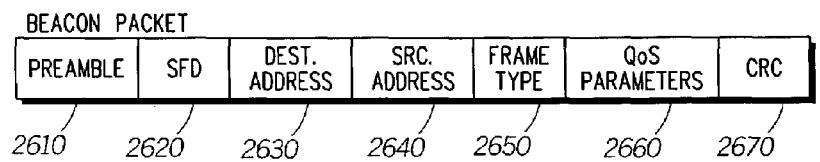
FIG. 26 illustrates an exemplary header packet containing QoS parameters useful for achieving improved performance in an asynchronous network, in accordance with certain embodiments of the present invention.
Figure 27:
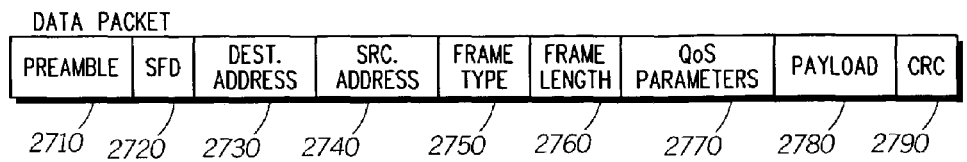
FIG. 27 illustrates an exemplary data packet containing QoS parameters useful for achieving improved performance in an asynchronous network, in accordance with certain embodiments of the present invention.

Referring now to the flowchart 2500 of FIG. 25, at Block 2510, the MD receives packets from non-MD device(s) submitting their communication requests. The communication requests may come in the form of packets, namely a beacon or header packet, such as that illustrated in FIG. 26, and an accompanying data packet, as in FIG. 27. Exemplary beacon packet 2600 may include a number of fields, such as preamble 2610, start frame delineator (SFD) 2620, destination address 2630, source address 2640, frame type 2650, QoS parameters 2660, and cyclic redundancy check (CRC) 2670. The frame type 2650 will include information about what type of data, such as data, video, voice, etc., will follow in the payload field 2780 and thus may be important information relating to the communication criteria to provide to the MD. In FIG. 27, a data packet 2700 may contain the following fields: preamble 2710, SFD 2720, destination address 2730, source address

2740, frame type 2650, frame length 2760, QoS parameters 2770, payload (data) 2780, and cyclic redundancy check (CRC) 2790.

The QoS fields 2660 and 2770 of the beacon and data packets contain information the sender communication device wishes to communicate to the MD concerning communication criteria to be met for the communication of the message (payload) to the target communication device. Such QoS information is referred to as SQoS parameters and may include, by way of example and not limitation, the following: expiration time of the data, packet type (normal, emergency, video, voice, private, public), sender identification (address), sender status, economic (the amount paid for what class of delivery service), the data rate of the sender communication device, method of encoding, the proposed length of the transmission, the message length for fragmentation purposes, the type of power (such as battery) still available to the sender communication device, memory size (may indicate its ability to prevent fragmentation of the message), etc.

Service differentiation may additionally be availed to improve QoS of the network based upon additional SQoS parameters. Based upon fields located in the data packet headers (2770), the MD can prioritize the order in which packet delivery should occur, thereby allowing the MD to provide different levels of service to communication devices based on predefined data attributes. For example, QoS field 2770 may give the expiration time of the data sought to be delivered (2780) so that the MD can provide packets with faster approaching expiration periods a higher delivery priority. Similarly, the QoS field may specify which packets can or cannot be dropped if the buffer of the MD exceeds its capacity. Moreover, authenticating information to allow the MD to authenticate a communication device before adding it may be provided to the MD as well.

The relevant QoS parameters are gathered and analyzed by the MD at Block 2520 and are used by the MD to make a determination about how, when, if, etc. the communication request will be serviced at Block 2530. Any problems identified at Decision Block 2540 may result in a service message being sent to the sending communication device regarding the problem and possibly providing suggestions on how to proceed. For instance, if it is determined that the target device does not have enough power to be on long enough to receive the transmission, then the MD may send a service message to the sender asking it to cease its transmission attempts. If there is no problem supporting the communication request, then the MD may send an acknowledgement message (such as with a synchronization signal) to one or both of the sending communication device and the target communication device at Block 2560. It will then service the communication request by transmitting the communication to the intended target communication device at Block 2570.

The SQoS parameters have been discussed above and are used by the MD to start the analysis process at Block 2520. The MD may also look at other QoS parameters, such as the ability of the MD to support the communication (MDQoS parameters), the ability of the network to support the communication (NQoS parameters), and particularly the ability of the target communication device to receive the message intended for it in accordance with the communication criteria set forth by the sending communication device (TQoS parameters). TQoS parameters may include, by way of example and not limitation, the following: power available to the target (reflects how long it will be "on" and available to receive), ability to deal with the type of data to be transmitted, its ability to support the encoding, ability to sustain communications for the time desired, etc. NQoS parameters reflect the network environment and potentially its ability to deal with the communication request and may include, by way of example and not limitation: interference levels within the neighborhood supported by the MD, the communication demands currently experienced by other communication devices within range. By way of example and not limitation, the MDQoS parameters may include the following: the logical position of the MD within the network with regard to other non-MD communication devices within range, the devices in range of the MD, the current channel traffic such as the number of messages sent in the last hour, for instance, the type of messages being sent, the status of other MDs in range (there may be another MD that can handle a communication if the instant MD is unable to), etc.

It is noted here that the MD need not gather and analyze all of these various types of QoS data. It may be prepared to make a decision concerning the communication request given very little or a lot of parameter information. For instance, the MD may decide to whether to support a communication request based simply on the communication criteria received from the sender and whether the target is on. Obviously, however, the more information that is considered by the MD, the better the QoS of the network. A determination made by the MD based upon SQoS, TQoS, MDQoS, and NQoS will be, in a lot of instances, a better reasoned decision than one based solely upon limited SQoS and TQoS parameters.

As regards the interference parameter, consider the effect a communication device entering the network in proximity to the MD and having a similar operating frequency would have. If measured interference surpassed a predefined acceptable threshold, the MD could transmit control information to all the regular, non-MD communication devices Within range. Moreover, the communication demand parameter would be useful if a particular communication device, needed to facilitate getting the communication to the target communication device, is experiencing a particularly heavy demand, indicative of a problem (Decision Block 2540). This information may prompt the MD to alert the sending communication device of the problem by sending a service message (Block 2550) informing the sender that the communication channel is currently highly error prone and susceptible to a corrupted transmission. The sending device could then make a decision to buffer its data or have the MD buffer the data until the problem has alleviated.

By performing one or more of screening incoming packets, rating the capability of non-MD nodes (such as the target communication device and any intervening nodes between the MD and the target) to carry on successful communications, and measuring the quality of the communication channel through NQoS parameters, the MD provides enhanced QoS assurance for a fully distributed network in a local manner. Because of the MD control information, in the form of various QoS parameters, discussed above, individual communication devices of the network need only know their own capabilities and have knowledge of the channel in their intermediate vicinity. Consequently, the number of unsuccessful transmissions, and, therefore, re-transmissions, may be significantly reduced, resulting in a tremendous savings in battery life of the communication devices and better utilization of limited bandwidth resources in the network. Moreover, the ability to process data packets and develop a packet hierarchy allows the MDs of the network to provide a mechanism for ensuring that some packets will be delivered in a more timely manner through exercise of service differentiation principles and that others discarded if so desired.

While the invention has been particularly shown and described with reference to a preferred embodiment, it will be understood by those skilled in the art that various changes in form and detail may be made therein without departing from the spirit and scope of the invention. For example, one of ordinary skill in the art will recognize that low power devices may by physically connected or wireless, without departing from the spirit and scope of the invention. In the first, second, and third preferred embodiments, single-channel communication devices are contained in each of the first, second and third preferred embodiments. Also, for each preferred embodiment, the transmit slot and receive slot of a communication device of the plurality of communication devices do not overlap. For all three embodiments, the duty cycle is defined as the fraction of time that the communication device is in either a transmit slot or a receive slot. Also for all three embodiments, the communication device is assumed to be a low communication duty cycle, low power, wireless device, but, again, this need not be the case.

Moreover, those of ordinary skill in the art will recognize that the present invention has been described in terms of exemplary method embodiments and that these embodiments may be implemented by means of computer-readable media tangibly embodying a program of instructions executable by a computer or programmed processor, as well as hardware equivalent components such as special purpose hardware and/or dedicated processors. Similarly, general purpose computers, microprocessor based computers, micro-controllers, optical computers, analog computers, dedicated processors and/or dedicated hard wired logic may be used to construct alternative equivalent embodiments of the present invention. Such alternatives should be considered equivalents.

The present invention may accordingly be implemented using one or more programmed processor executing programming instructions that are broadly described above in flow chart form and which can be stored in any suitable electronic storage medium. However, those skilled in the art will appreciate that the processes described above can be implemented in any number of variations and in many suitable programming languages without departing from the present invention. Thus, the process can be described by a set of instructions implementing the processes described and stored on a computer storage medium such as a magnetic disc, optical disc, magneto-optical disc, semiconductor memory, etc. Many such variations and modifications are contemplated and considered equivalent.

While the invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims.

What is claimed is:

1. A method of providing improved quality of service (QoS) control in an asynchronous network having a plurality of communication devices, at least one of which is operable to selectively function normally or as a non-dedicated mediation device when selected, comprising:
   analyzing a plurality of quality of service (QoS) parameters relevant to a communication request received from a sender communication device of the plurality of communication devices of the asynchronous network to send a communication intended for a target communication device of the plurality of communication devices;
   selecting the non-dedicated mediation device of the plurality of communication devices to provide a mediation function for the sender communication device and the target communication device, wherein the non-dedicated mediation device is selected based upon the analysis of the QoS parameters relevant to the communication request;
   the non-dedicated mediation device making a determination on how to respond to the communication request based upon the analysis of the plurality of QoS parameters;
   if the determination is that the communication request can be serviced, the non-dedicated mediation device servicing the communication request based on a communication schedule of at least one of the sender and target communication devices.

2. The method of claim 1, further comprising:
   if the determination is that the communication request cannot be serviced, the non-dedicated mediation device sending a service message to the sender communication device of the plurality of communication devices.

3. The method of claim 1, further comprising:
   the non-dedicated mediation device sending an acknowledgement to the sender communication device of the plurality of communication devices if the communication criteria can be satisfied.

4. The method of claim 1, wherein analyzing the plurality of QoS parameters further comprises:
   analyzing a plurality of sender quality of service (SQoS) parameters of the plurality of QoS parameters relevant to communication criteria of the sender communication device.

5. The method of claim 4, wherein if the analysis of the plurality of SQoS parameters indicates that the communication criteria of the sender communication device can be satisfied, making the determination that the communication request can be serviced and servicing the communication request.

6. The method of claim 4, further comprising:
   analyzing a plurality of target quality of service (TQoS) parameters of the plurality of QoS parameters relevant to the ability of the target communication device to receive the communication in accordance with the communication criteria.

7. The method of claim 6, wherein if the analysis of the plurality of SQoS parameters and the TQoS parameters indicates that the communication criteria of the sender communication device can be satisfied by the target communication device, making the determination that the communication request can be serviced and servicing the communication request.

8. The method of claim 6, further comprising:
   analyzing a plurality of mediation device quality of service (MDQoS) parameters of the plurality of QoS parameters relevant to the ability of the non-dedicated mediation device to service the communication request.

9. The method of claim 8, wherein if the analysis of the plurality of SQoS parameters, the TQoS parameters and the MDQoS parameters indicates that the communication criteria of the sender communication device can be satisfied by the non-dedicated mediation device and the target communication device, making the determination that the communication request can be serviced and servicing the communication request.

10. The method of claim 8, further comprising:
    analyzing a plurality of network quality of service (NQoS) parameters of the plurality of QoS parameters relevant to the ability of the network to service the communication request.

11. The method of claim 10, wherein if the analysis of the plurality of SQoS parameters, the TQoS parameters, the MDQoS parameters and the NQoS parameters indicates that the communication criteria of the sender communication device can be satisfied by the network, the target communication device, and the non-dedicated mediation device, making the determination that the communication request can be serviced and servicing the communication request.

12. The method of claim 6, further comprising:
analyzing a plurality of network quality of service (NQoS) parameters of the plurality of QoS parameters relevant to the ability of the network to service the communication request.

13. The method of claim 12, wherein if the analysis of the plurality of SQoS parameters, the TQoS parameters and the NQoS parameters indicates that the communication criteria of the sender communication device can be satisfied by the network and the target communication device, making the determination that the communication request can be serviced and servicing the communication request.

14. An asynchronous communications network, comprising:
a plurality of communication devices of the asynchronous communications network;
a non-dedicated mediation device (MD) of the plurality of communication devices operable to provide improved quality of service (QoS) control and control of communications between the plurality of communication devices in the asynchronous communications network when selected and operable to function as a communication device of the plurality of communication devices;
wherein the mediation device analyzes a plurality of quality of service (QoS) parameters relevant to a communication request from a sender communication device of the plurality of communication devices to send a communication to a target communication device of the plurality of communication devices and makes a determination on how to respond to the communication request based upon the analysis of the plurality of QoS parameters and wherein if a determination to respond is made the mediation device responds to the communication request based on a communication schedule of at least one of the sender and target communication devices, wherein the non-dedicated mediation device is operable to selectively provide a mediation function between the sender communication device and the target communication device and is selected to provide the mediation function based upon analysis of the QoS parameters.

15. The network of claim 14, wherein if the non-dedicated mediation device makes the determination that the communication request can be serviced, the non-dedicated mediation device services the communication request.

16. The network of claim 15, wherein prior to servicing the communication request the non-dedicated mediation device further sends an acknowledge message to at least one of the sender communication device and the target communication device that the non-dedicated mediation device will service the communication request.

17. The network of claim 14, wherein if the non-dedicated mediation device makes the determination that the communication request cannot be serviced, the non-dedicated mediation device sends a service message to the sender communication device.

18. The network of claim 14, wherein the non-dedicated mediation device analyzes a plurality of sender quality of service (SQoS) parameters of the plurality of QoS parameters that are relevant to communication criteria of the sender communication device.

19. The network of claim 18, wherein if the analysis of the plurality of SQoS parameters indicates that the communication criteria of the sender communication device can be satisfied, the non-dedicated mediation device determines that the communication request can be serviced and services the communication request.

20. The network of claim 14, wherein the non-dedicated mediation device analyzes a plurality of target quality of service (TQoS) parameters of the plurality of QoS parameters relevant to the ability of the target communication device to receive the communication in accordance with the communication criteria.

21. The network of claim 20, wherein if the analysis of the plurality of SQoS parameters and the TQoS parameters indicates that the communication criteria of the sender communication device can be satisfied by the target communication device, the non-dedicated mediation device determines that the communication request can be serviced and services the communication request.

22. The network of claim 20, wherein the non-dedicated mediation device analyzes a plurality of mediation device quality of service (MDQoS) parameters of the plurality of QoS parameters relevant to the ability of the non-dedicated mediation device to service the communication request.

23. The network of claim 22, wherein if the analysis of the plurality of SQoS parameters, the TQoS parameters and the MDQoS parameters indicates that the communication criteria of the sender communication device can be satisfied by the non-dedicated mediation device and the target communication device, the non-dedicated mediation device determines that the communication request can be serviced and services the communication request.

24. The network of claim 22, wherein the non-dedicated mediation device analyzes a plurality of quality of service (NQoS) parameters of the plurality of QoS parameters relevant to the ability of the network to service the communication request.

25. The network of claim 24, wherein if the analysis of the plurality of SQoS parameters, the TQoS parameters, the MDQoS parameters and the NQoS parameters indicates that the communication criteria of the sender communication device can be satisfied by the network, the target communication device, and the non-dedicated mediation device, the non-dedicated mediation device determines that the communication request can be serviced and services the communication request.

26. The network of claim 20, wherein the non-dedicated mediation device analyzes a plurality of network quality of service (NQoS) parameters of the plurality of QoS parameters relevant to the ability of the network to service the communication request.

27. The network of claim 26, wherein if the analysis of the plurality of SQoS parameters, the TQoS parameters and the NQoS parameters indicates that the communication criteria of the sender communication device can be satisfied by the network and the target communication device, the non-dedicated mediation device determines that the communication request can be serviced and services the communication request.

28. A non-dedicated mediation communication device of a plurality of communication devices operable to provide improved quality of service (QoS) control in the asynchronous communications network, comprising:
a processing and control element operable to analyze a plurality of quality of service (QoS) parameters relevant to a communication request from a sender communication device of the plurality of communication devices to send a communication to a target communication device of the plurality of communication devices, control communications between the plurality of communication devices, and make a determination on how to respond to the communication request based upon the analysis of the plurality of QoS parameters;

a receiver, coupled to and controlled by the processing and control element, that receives the communication request from the sender communication device; and a transmitter, coupled to and controlled by the processing and control element, wherein if the non-dedicated mediation device makes a determination to respond to the communication request the non-dedicated mediation device does so based on a communication schedule of at least one of the sender and target communication devices and wherein the non-dedicated mediation device is selectable to serve a mediation function between the sender and target communication devices based upon the QoS parameters relevant to the communication request.

29. The device of claim 28, wherein if the processing and control element makes the determination that the communication request can be serviced, the processing and control element causing the transmitter to transmit the communication to the target communication device.

30. The device of claim 29, wherein prior to servicing the communication request the processing and control element causes the transmitter to send an acknowledge message to at least one of the sender communication device and the target communication device that the mediation communication device will service the communication request.

31. The device of claim 28, wherein if the processing and control element makes the determination that the communication request cannot be serviced, the processing and control element causes the transmitter to send a service message to the sender communication device.

32. The device of claim 28, wherein the processing and control element analyzes a plurality of sender quality of service (SQoS) parameters of the plurality of QoS parameters that are relevant to communication criteria of the sender communication device.

33. The device of claim 32, wherein if the analysis of the plurality of SQoS parameters indicates that the communication criteria of the sender communication device can be satisfied, the processing and control element determines that the communication request can be serviced and causes the transmitter to transmit the communication to the target communication device.

34. The device of claim 28, wherein the processing and control element analyzes a plurality of target quality of service (TQoS) parameters of the plurality of QoS parameters relevant to the ability of the target communication device to receive the communication in accordance with the communication criteria.

35. The device of claim 34, wherein if the analysis of the plurality of SQoS parameters and the TQoS parameters indicates that the communication criteria of the sender communication device can be satisfied by the target communication device, the processing and control element determines that the communication request can be serviced and causes the transmitter to transit the communication to the target communication device.

36. The device of claim 34, wherein the processing and control element analyzes a plurality of mediation device quality of service (MDQoS) parameters of the plurality of QoS parameters relevant to the ability of the non-dedicated mediation device to service the communication request.

37. The device of claim 36, wherein if the analysis of the plurality of SQoS parameters, the TQoS parameters and the MDQoS parameters indicates that the communication criteria of the sender communication device can be satisfied by the non-dedicated mediation device and the target communication device, the processing and control element determines that the communication request can be serviced and causes the transmitter to transmit the communication to the target communication device.

38. The device of claim 36, wherein the processing and control element analyzes a plurality of quality of service (NQoS) parameters of the plurality of QoS parameters relevant to the ability of the network to service the communication request.

39. The device of claim 38, wherein if the analysis of the plurality of SQoS parameters, the TQoS parameters, the MDQoS parameters and the NQoS parameters indicates that the communication criteria of the sender communication device can be satisfied by the network, the target communication device, and the non-dedicated mediation device, the processing and control element determines that the communication request can be serviced and causes the transmitter to transmit the communication to the target communication device.

40. The device of claim 34, wherein the processing and control element analyzes a plurality of network quality of service (NQoS) parameters of the plurality of QoS parameters relevant to the ability of the network to service the communication request.

41. The device of claim 28, wherein if the analysis of the plurality of SQoS parameters, the TQoS parameters and the NQoS parameters indicates that the communication criteria of the sender communication device can be satisfied by the network and the target communication device, the processing and control element determines that the communication request can be serviced and causes the transmitter to transmit the communication to the target communication device.

42. Computer-readable media tangibly embodying a program of instructions executable by a computer to perform a method to provide improved quality of service (QoS) control in an asynchronous network having a plurality of communication devices, at least one of which is operable to selectively function normally or as a non-dedicated mediation device when selected, the method comprising:

analyzing a plurality of quality of service (QoS) parameters relevant to a communication request received from a sender communication device of the plurality of communication devices of the asynchronous network to send a communication intended for a target communication device of the plurality of communication devices;

selecting the non-dedicated mediation device of the plurality of communication devices to provide a mediation function for the sender communication device and the target communication device, wherein the non-dedicated mediation device is selected based upon the analysis of the QoS parameters relevant to the communication request;

the non-dedicated mediation device making a determination on how to respond to the communication request based upon the analysis of the plurality of QoS parameters; and if the determination is that the communication request can be serviced, the non-dedicated mediation device servicing the communication request based on a communication schedule of at least one of the sender and target communication devices.

* * * * *